(12) United States Patent
Mu et al.

(10) Patent No.: US 11,909,534 B2
(45) Date of Patent: *Feb. 20, 2024

(54) HARQ FEEDBACK METHOD AND APPARATUS

(71) Applicant: Beijing Xiaomi Mobile Software Co., Ltd., Beijing (CN)

(72) Inventors: Qin Mu, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,663

(22) Filed: Aug. 17, 2022

(65) Prior Publication Data

US 2022/0393804 A1    Dec. 8, 2022

Related U.S. Application Data

(63) Continuation of application No. 17/072,578, filed on Oct. 16, 2020, which is a continuation of application No. PCT/CN2018/084680, filed on Apr. 26, 2018.

(51) Int. Cl.
*H04L 1/18* (2023.01)
*H04W 72/12* (2023.01)
(Continued)

(52) U.S. Cl.
CPC .......... *H04L 1/1819* (2013.01); *H04L 1/0038* (2013.01); *H04W 72/1263* (2013.01);
(Continued)

(58) Field of Classification Search
CPC ... H04W 72/535; H04W 72/51; H04W 72/52; H04W 72/53; H04W 72/23; H04W 72/27;
(Continued)

(56) References Cited

U.S. PATENT DOCUMENTS

2018/0324869 A1   11/2018   Phuyal
2019/0159257 A1   5/2019   Rico Alvarino
(Continued)

FOREIGN PATENT DOCUMENTS

CN   101431395 A   5/2009
CN   101997663 A   3/2011
(Continued)

OTHER PUBLICATIONS

Huawei et al., Early Data Transmission in RACH for NB-IoT, 3GPP TSG RAN WG1 Meeting #92, R1-1801438, Athens, Greece, Feb. 26-Mar. 2, 2018, 4 pages.
(Continued)

*Primary Examiner* — Phong La
(74) *Attorney, Agent, or Firm* — Finnegan, Henderson, Farabow, Garrett & Dunner, L.L.P.

(57) ABSTRACT

A hybrid automatic repeat request (HARQ) feedback method is applied to a terminal, wherein a base station allocates to the terminal multiple available scheduling resources configured to provide Early Data Transmission (EDT) service. The method includes: selecting an available scheduling resource from the multiple available scheduling resources; sending EDT data to the base station on the selected available scheduling resource; determining a HARQ feedback time point for the EDT data according to a preset rule; and when HARQ information sent by the base station is received at the HARQ feedback time point, determining a transmission result of the EDT data based on the HARQ information.

12 Claims, 35 Drawing Sheets

---

For any UL transmission ending time point, a HARQ feedback time point corresponding to the UL transmission ending time point is determined, the determined HARQ feedback time point being at a specified position after the UL transmission ending time point — 510

For a blind detection result of any UL transmission ending time point, when the blind detection result is successful demodulation, the first information indicating successful demodulation is sent to the terminal at the HARQ feedback time point corresponding to the UL transmission ending time point — 520

When the blind detection result is unsuccessful demodulation, the second information indicating unsuccessful demodulation is sent to the terminal at the HARQ feedback time point corresponding to the UL transmission ending time point — 530

(51) Int. Cl.
*H04L 1/1812* (2023.01)
*H04L 1/00* (2006.01)
*H04W 72/1263* (2023.01)
*H04W 72/23* (2023.01)
*H04W 72/50* (2023.01)

(52) U.S. Cl.
CPC ......... *H04W 72/23* (2023.01); *H04W 72/535* (2023.01); *H04W 74/0833* (2013.01)

(58) Field of Classification Search
CPC ..... H04W 72/29; H04W 72/20; H04W 72/21; H04W 72/25; H04W 72/1263; H04W 72/121; H04W 72/12; H04W 72/1221; H04W 72/1215; H04W 74/0833; H04W 74/08; H04W 74/0808; H04L 1/1819; H04L 1/1816; H04L 1/1812; H04L 1/0038; H04L 1/0036; H04L 27/0012
See application file for complete search history.

(56) References Cited

U.S. PATENT DOCUMENTS

| | | | |
|---|---|---|---|
| 2019/0215872 A1 | 7/2019 | Park | |
| 2020/0092044 A1* | 3/2020 | Park | H04L 1/189 |
| 2020/0187245 A1 | 6/2020 | Fujishiro | |

FOREIGN PATENT DOCUMENTS

| | | | | |
|---|---|---|---|---|
| CN | 110062474 | * | 1/2018 | ........... H04L 5/0052 |
| CN | 108513714 A | | 9/2018 | |
| CN | 110062474 A | | 7/2019 | |
| CN | 110149722 A | | 8/2019 | |
| CN | 112237047 A | | 1/2021 | |
| RU | 2510578 C2 | | 3/2014 | |
| WO | WO 2011022920 A1 | | 3/2011 | |
| WO | WO 2016073591 A1 | | 5/2016 | |
| WO | WO 2018062957 A1 | | 4/2018 | |

OTHER PUBLICATIONS

Huawei et al. Remaining Issues on HARQ, 3GPP TSG RAN WG 1 Meeting 91, R1-1719401, Reno, Nevada, USA, Nov. 27-Dec. 1, 2017, 14 pages.

International Search Report in International Application No. PCT/CN2018/084680, dated Jan. 2, 2019.

Kyocera, Remaining issues for basic functionality of EDT in eFeMTC/FeNB-IoT, 3GPP TSG-RAN WG2 #100, R2-1713503, Reno, Nevada, USA, Nov. 27-Dec. 1, 2017, 7 pages.

Kyocera, Details of Early data transmission for eFeMTC, 3GPP TSG-RAN WG2 #99bis, R2-17101791, Prague, Czech Republic, Oct. 9-13, 2017, 5 pages.

First Office Action of Chinese Application No. 201880000651.7, dated Jun. 26, 2019.

English translation of Written Opinion of the International Search Authority in the international application No. PCT/CN2018/084680, dated Jan. 2, 2019.

Sony, "Considerations in EDT using Message 3", 3GPP TSG RAN WG1 Meeting #92, R1-1802055, Athens, Greece, Feb. 26-Mar. 2, 2018, 3 pages.

Zte et al., "On early data transmission for eMTC", 3GPP TSG RAN WG1 Meeting #92; R1-1801619, Athens, Greece, Feb. 26-Mar. 2, 2018, 5 pages.

Office Action of Russian Application No. 2020138003, dated May 6, 2021.

Qualcomm Incorporated, "Email discussion report: [99#45][NB-IoT/MTC] Early data transmission", 3GPP TSG-RAN WG2 Meeting #99bis, R2-1710888, Prague, Czechia, Oct. 9-13, 2017, 42 pages.

Extended European Search Report in European Application No. 18916208.4, dated Mar. 29, 2021.

Zte, Sanechips, "Remaining issues on UL HARQ-ACK feedback for Mtg", 3GPP TSG RAN WG1 Meeting #92bis, R1-1804175, Sanya, China, Apr. 16-20, 2018, 6 pgs.

LG Electronics," Discussion on UL aspects in TDD NB-IoT", 3GPP TSG RAN WG1 Meeting #92bis, R1-1804529, Sanya, China, Apr. 16-20, 2018, 15 pgs.

Xiaomi Communications, "Discussion on remaining issues of EDT for NB-IoT", 3GPP TSG RAN WG1 Meeting #93, R1-1807137, Busan, Korea, May 21-25, 2018, 4 pgs.

Notice of Reasons for Refusal dated Nov. 1, 2021, from the Japanese Patent Office issued in counterpart Japanese Application No. 2020-559410.

Examination Report dated Dec. 15, 2021, from the Intellectual Property of India issued in counterpart Indian Application No. 202047050756.

* cited by examiner

HARQ FEEDBACK METHOD AND APPARATUS

CROSS-REFERENCE TO RELATED APPLICATION

This application is a continuation of U.S. application Ser. No. 17/072,578, filed Oct. 16, 2020, which is a continuation of International Application No. PCT/CN2018/084680 filed on Apr. 26, 2018, is the entire contents of both of which are incorporated herein by reference in its entirety.

TECHNICAL FIELD

The present disclosure generally relates to the technical field of communication, and particularly, to a hybrid automatic repeat request (HARQ) feedback method and apparatus.

BACKGROUND

Narrow Band Internet of Things (NB-IoT) and Machine Type Communication (MTC) are promising cellular IoT technologies and have been widely used. Moreover, a mechanism for transmitting uplink (UL) data in a random access process has been introduced into NB-IoT and MTC so as to further reduce a transmission delay and save power. The mechanism is called Early Data Transmission (EDT) during RACH for short. The RACH may refer to random access channel. However, in an existing EDT process, a base station and a terminal usually have different HARQ feedback contents and times, resulting in reduction of transmission quality.

SUMMARY

According to a first aspect of embodiments of the present disclosure, a hybrid automatic repeat request (HARQ) feedback method is applied to a terminal, wherein a base station allocates to the terminal multiple available scheduling resources configured to provide Early Data Transmission (EDT) service. The method includes: selecting an available scheduling resource from the multiple available scheduling resources; sending EDT data to the base station on the selected available scheduling resource; determining a HARQ feedback time point for the EDT data according to a preset rule; and when HARQ information sent by the base station is received at the HARQ feedback time point, determining a transmission result of the EDT data based on the HARQ information.

According to a second aspect of embodiments of the present disclosure, a HARQ feedback method is applied to a base station that allocates, to a terminal, multiple available scheduling resources configured to provide EDT service. The method includes: performing blind detection on EDT data transmitted by the terminal on the multiple available scheduling resources; determining a HARQ feedback time point for the blind detection according to a preset rule; and sending HARQ information about the blind detection to the terminal at the HARQ feedback time point.

According to a third aspect of embodiments of the present disclosure, a terminal to which a base station allocates multiple available scheduling resources configured to provide EDT service, includes: a processor; and a memory configured to store instructions executable by the processor, wherein the processor is configured to: select an available scheduling resource from the multiple available scheduling resources; send EDT data to the base station on the selected available scheduling resource; determine a HARQ feedback time point for the EDT data according to a preset rule; and when HARQ information sent by the base station is received at the HARQ feedback time point, determine a transmission result of the EDT data based on the HARQ information According to a fourth aspect of embodiments of the present disclosure, a base station allocates multiple available scheduling resources configured to provide EDT service to a terminal. The base station includes: a processor; and a memory configured to store instructions executable by the processor, wherein the processor is configured to: perform blind detection on EDT data transmitted by the terminal on the multiple available scheduling resources; determine a HARQ feedback time point for the blind detection according to a preset rule; and send HARQ information about the blind detection to the terminal at the HARQ feedback time point.

It is to be understood that the above general description and the detailed description below are only exemplary and explanatory and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for describing exemplary embodiments and not intended to limit the present disclosure. For example, the terms "first," "second," "third" and the like may be adopted to describe various information in the present disclosure, the information should not be limited to these terms. These terms are only adopted to distinguish the information of the same type. For example, without departing from the scope of the present disclosure, first information may also be referred to as second information and, similarly, second information may also be referred to as first information.

Figure 1:
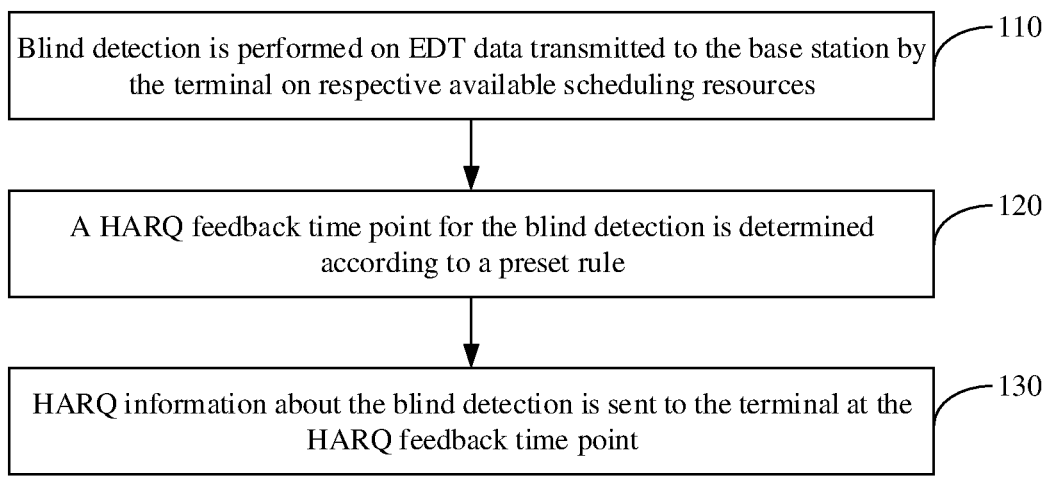
FIG. 1 is a flowchart of a HARQ feedback method according to an exemplary embodiment.

FIG. 1 is a flowchart of a HARQ feedback method according to an exemplary embodiment. The HARQ feedback method may be applied to a base station that allocates, to a terminal, multiple available scheduling resources configured to provide EDT service. As shown in FIG. 1, the HARQ feedback method may include the following operations.

In operation 110, blind detection is performed on EDT data transmitted to the base station by the terminal on respective available scheduling resources.

In an embodiment, the base station may provide the EDT service and may allocate multiple available scheduling resources configured to provide the EDT service to the terminal applying for the EDT service.

For example, the base station may allocate an available scheduling resource 1, an available scheduling resource 2, an available scheduling resource 3, and an available scheduling resource 4 to the terminal. The number of resource units (N_RUs) in each of the available scheduling resource 1, the available scheduling resource 2, the available scheduling resource 3, and the available scheduling resource 4 is 3. However, a transmission block size (TBS) and a UL transmission repetition count of the available scheduling resource 1 are 328 bits and 32, respectively. A TBS and a UL transmission repetition count of the available scheduling resource 2 are 536 bits and 48, respectively. A TBS and a UL transmission repetition count of the available scheduling resource 3 are 776 bits and 64, respectively. A TBS and a UL transmission repetition count of the available scheduling resource 4 are 1,000 bits and 96, respectively.

In addition, the base station allocates multiple available scheduling resources to the terminal for enabling the terminal to select an available scheduling resource from these available scheduling resources according to its own actual condition and send EDT data to the base station on the selected available scheduling resource. The selected available scheduling resource may be an available scheduling resource actually used by the terminal. However, the base station does not know the specific available scheduling resource to be adopted by the terminal for transmission. Accordingly, the base station may perform blind detection on each available scheduling resource. That is, the base station may perform blind detection on the available scheduling resource actually used by the terminal and may also perform blind detection on the other available scheduling resources.

In an embodiment, the EDT data may include UL data transmitted by the terminal in a random access process and is in a message 3 (scheduled transmission, msg3) in the random access process. That is, the terminal may add the EDT data to the message 3 and send the message 3 to the base station such that the base station can acquire the EDT data transmitted by the terminal from the message 3.

In an embodiment, the available scheduling resource may include a TBS and a UL transmission repetition count. Operation 110 may be executed in, but not limited to, the following implementation manners: a UL transmission ending time point is determined respectively for each available scheduling resource based on the TBS and UL transmission repetition count in each available scheduling resource; and blind detection is performed on the EDT data at each UL transmission ending time point.

In operation 120, a HARQ feedback time point for the blind detection is determined according to a preset rule.

In an embodiment, since the base station may perform blind detection on the available scheduling resource actually used by the terminal and may also perform blind detection on the other available scheduling resources, a specific time point for HARQ feedback is determined.

In addition, the HARQ feedback time point for the blind detection may be determined according to a preset rule. The preset rule may be included in an EDT protocol such that both the base station and the terminal can acquire the preset rule according to the EDT protocol.

Moreover, for meeting different requirements of the base station and the terminal, the predefined preset rule may include, but not limited to, the following three examples, but the base station and the terminal may negotiate about the specific preset rule to be adopted by the base station and the terminal in advance.

Figure 4A:
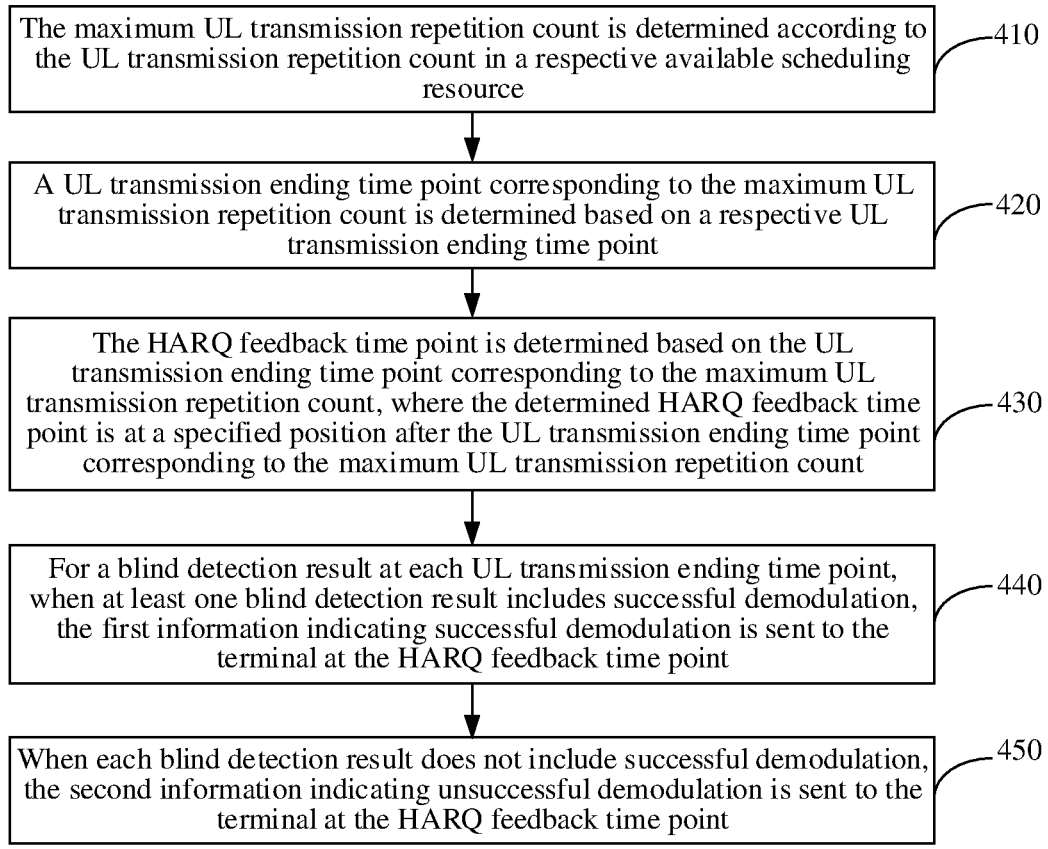
FIG. 4A is a flowchart of a HARQ feedback method according to an exemplary embodiment.

In a first example, the preset rule is that a HARQ feedback is made based on a maximum UL transmission repetition count. Details about an exemplary implementation process is illustrated in FIG. 4A.

Figure 5A:
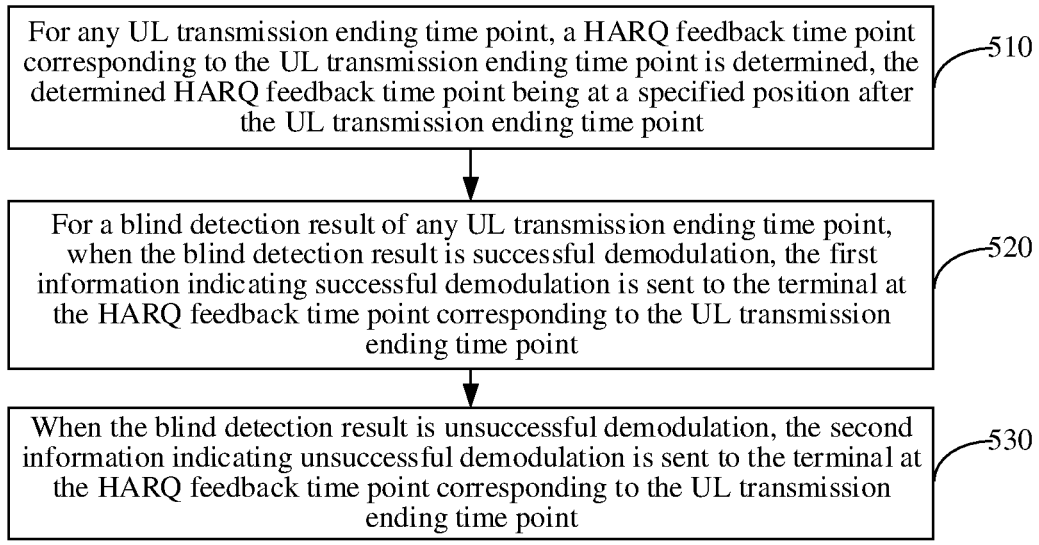
FIG. 5A is a flowchart of a HARQ feedback method according to an exemplary embodiment.

In a second example, the preset rule is that a HARQ feedback is made for a UL transmission ending time point respectively for each available scheduling resource. Details about an exemplary implementation process is illustrated in FIG. 5A.

Figure 6A:
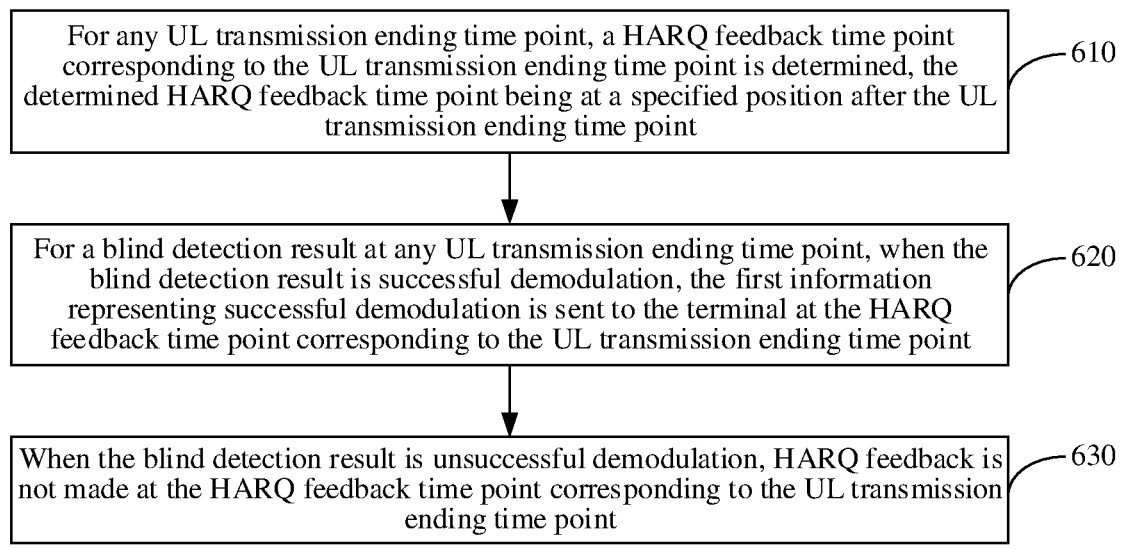
FIG. 6A is a flowchart of a HARQ feedback method according to an exemplary embodiment.

In a third example, the preset rule is that a HARQ feedback is made only when a blind detection result is successful demodulation. Details about an exemplary implementation process is illustrated in FIG. 6A.

In operation 130, HARQ information about the blind detection is sent to the terminal at the HARQ feedback time point.

In an embodiment, after the base station sends the HARQ information to the terminal at the HARQ feedback time point, the terminal, after receiving the HARQ information from the base station at the HARQ feedback time point determined according to the preset rule, may determine a transmission result of the EDT data based on the HARQ information.

Figure 2:
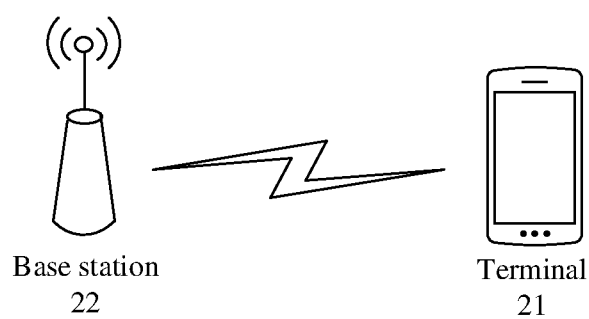
FIG. 2 is a diagram of an application scenario of a HARQ feedback method according to an exemplary embodiment.

FIG. 2 is a diagram of an application scenario of the HARQ feedback method according to an exemplary embodiment. In FIG. 2, a terminal 21 and a base station 22 are included in the application scenario. The base station 22 may allocate multiple available scheduling resources to the terminal 21, for example, an available scheduling resource 1, an available scheduling resource 2, an available scheduling resource 3, and an available scheduling resource 4. The terminal 21 may select an available scheduling resource from these available scheduling resources. For example, the selected available scheduling resource may be the available scheduling resource 2. In such case, the terminal 21 may send EDT data to the base station 22 on the available scheduling resource 2. The base station 22, although allocating the multiple available scheduling resources to the terminal, does not know that the terminal 21 transmits the data on the available scheduling resource 2. Accordingly, the base station 22 is configured to perform blind detection on the EDT data on each available scheduling resource, determine a HARQ feedback time point for the blind detection according to a preset rule and send HARQ information about the blind detection to the terminal 21 at the HARQ feedback time point. Then, the terminal 21, after receiving the HARQ information front the base station 22 at the HARQ feedback time point determined according to the preset rule, may determine a transmission result of the EDT data based on the HARQ information. Therefore, the EDT reliability is improved.

In the embodiment, blind detection may be performed on the EDT data transmitted to the base station by the terminal on each available scheduling resource. The HARQ feedback time point for the blind detection may be determined according to the preset rule. The HARQ information about the blind detection may be sent to the terminal at the HARQ feedback time point. Then, the terminal may receive the HARQ information from the base station at the HARQ feedback time point determined according to the preset rule and determine a correct transmission result of the EDT data based on the HARQ information. Accordingly, the HARQ feedback reliability is improved, and the EDT efficiency is also improved.

Figure 3A:
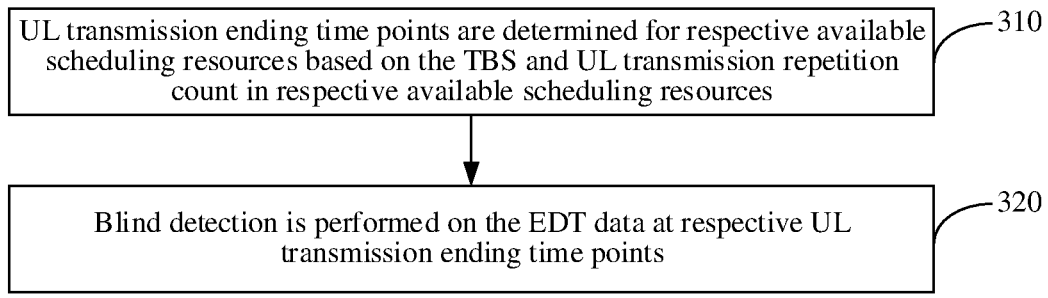
FIG. 3A is a flowchart of a HARQ feedback method according to an exemplary embodiment.

FIG. 3A is a flowchart of a HARQ feedback method according to an exemplary embodiment. The HARQ feedback method may be applied to a base station that allocates, to a terminal, multiple available scheduling resources configured to provide EDT service. Based on the method in FIG. 1, the available scheduling resource includes the TBS and the UL transmission repetition count. When operation 110 is executed, as shown in FIG. 3A, the following operations may be included.

In operation 310, UL transmission ending time points are determined for respective available scheduling resources based on the TBS and UL transmission repetition count in respective available scheduling resources.

Figure 3B:
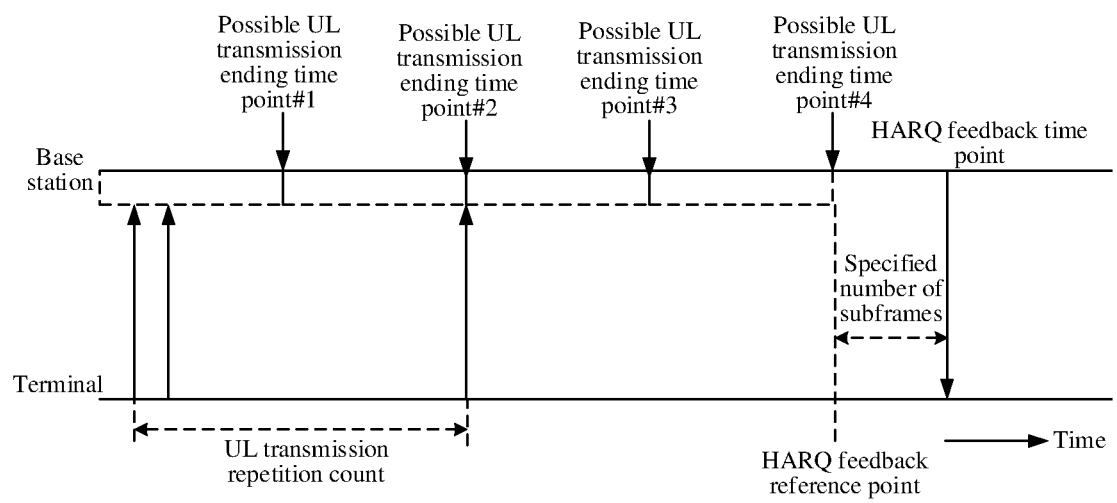
FIG. 3B is an information interaction diagram of a HARQ feedback method according to an exemplary embodiment.

In an embodiment, the amount of the UL transmission ending time points may be determined according to the amount of the TBSs. For example, the number of the TBSs is 4, and the number of the UL transmission ending time points is also 4. Since the terminal have four possible TBS choices corresponding to four different UL transmission repetition counts, there may be four possible UL transmission ending time points during EDT. As shown in FIG. 3B, the four possible UL transmission ending time points may be a possible UL transmission ending time point #1, a possible UL transmission ending time point #2, a possible UL transmission ending time point #3 and a possible UL transmission ending time point #4 respectively.

In operation 320, blind detection is performed on the EDT data at respective UL transmission ending time points.

In the embodiment, the UL transmission ending time point may be determined respectively for each available scheduling resource based on the TBS and UL transmission repetition count in each available scheduling resource, and blind detection may be performed on the EDT data at each UL transmission ending time point. Accordingly, the blind detection accuracy is improved.

FIG. 4A is a flowchart of a HARQ feedback method according to an exemplary embodiment. The HARQ feedback method may be applied to a base station that allocates, to a terminal, multiple available scheduling resources configured to provide EDT service. Based on the method shown in FIG. 1, the preset rule is that a HARQ feedback is made based on the maximum UL transmission repetition count. When operation 120 is executed, as shown in FIG. 4A, the following operations may be included.

In operation 410, the maximum UL transmission repetition count is determined according to the UL transmission repetition count in a respective available scheduling resource.

In an embodiment, the UL transmission repetition count in each available scheduling resource may be different from each other. The maximum UL transmission repetition count may be determined from these different UL transmission repetition counts.

For example, the base station may allocate the available scheduling resource 1, the available scheduling resource 2, the available scheduling resource 3, and the available scheduling resource 4 to the terminal. UL transmission repetition counts of the available scheduling resource 1, the available scheduling resource 2, the available scheduling resource 3, and the available scheduling resource 4 are 32, 48, 64, and 96, respectively. In such case, the maximum UL transmission repetition count is 96.

In operation 420, a UL transmission ending time point corresponding to the maximum UL transmission repetition count is determined based on a respective UL transmission ending time point.

In an embodiment, the maximum UL transmission repetition count corresponds to maximum possible transmission time point. That is, the maximum possible transmission time point may be determined by the maximum UL transmission repetition count. Moreover, the UL transmission ending time point corresponding to the maximum UL transmission repetition count may be the last UL transmission ending time point among the UL transmission ending time points. As shown in FIG. 3B, the last UL transmission ending time point may be the possible UL transmission ending time point #4.

In operation 430, the HARQ feedback time point is determined based on the UL transmission ending time point corresponding to the maximum UL transmission repetition count, where the determined HARQ feedback time point is at a specified position after the UL transmission ending time point corresponding to the maximum UL transmission repetition count.

In an embodiment, the specified position may be a preset fixed value or a numerical value determined by the base station according to an actual condition. For example, the specified position may be a specified number of subframes. Moreover, a value of the specified number is usually larger than or equal to 4. If one subframe is 1 ms, then four subframes is 4 ms.

For example, the specified position may be a position after a specified number of subframes. That is, the HARQ feedback time is a sum of the maximum possible transmission time (the maximum possible transmission time is determined by the maximum UL transmission repetition count) and the specified number of subframes. As shown in FIG. 33, the UL transmission ending time point corresponding to the maximum UL transmission repetition count is the possible UL transmission ending time point #4. The possible UL transmission ending time point #4 is set as a HARQ feedback reference point. A position after the specified number of subframes relative to the HARQ feedback reference point is determined as the HARQ feedback time point.

Figure 4B:
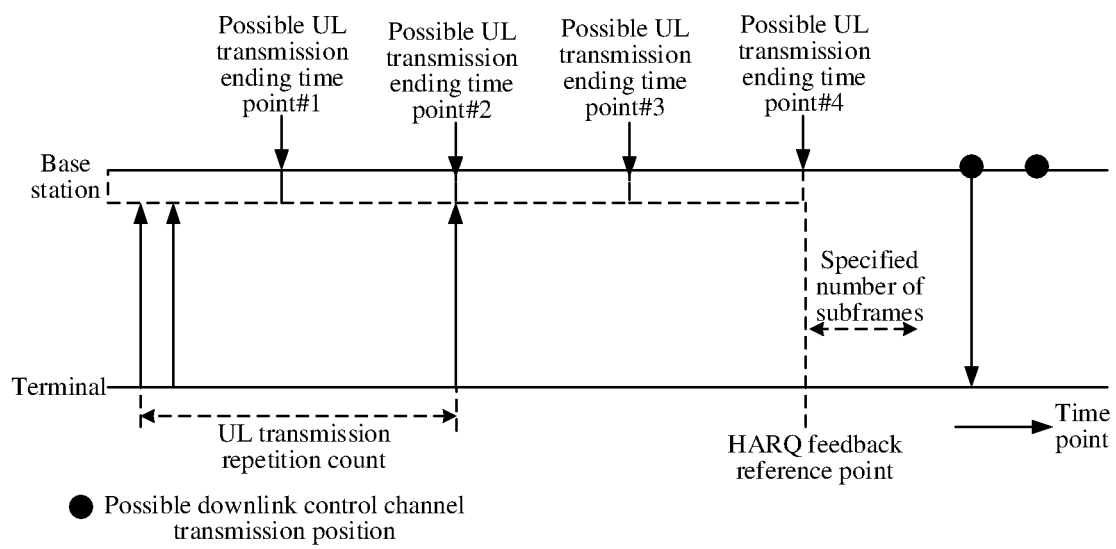
FIG. 4B is an information interaction diagram of a HARQ feedback method according to an exemplary embodiment.

For another example, the specified position may be a first downlink control channel transmission position after the specified number of subframes. A possible downlink control channel transmission position shown in FIG. 4B may be determined as the HARQ feedback time point.

In an embodiment, the specified position is configured by the base station and is in a UL grant in a random access response (RAR). That is, the base station may add the specified position to the UL grant in the RAR and send the RAR to the terminal. The terminal may determine the specified position configured by the base station according to the RAR. In another embodiment, the preset rule includes third information indicating the specified position, and the third information indicates a relative relationship between a HARQ feedback time point and a determined UL transmission ending time point. That is, a specific content of the specified position is fixedly written in the preset rule. Accordingly, both the base station and the terminal can determine the specified position based on the third information in the preset rule.

In an embodiment, the HARQ information about the blind detection may include first information indicating successful demodulation or second information indicating unsuccessful demodulation. When operation 130 is executed, as shown in FIG. 4A, the following operations may be included.

In operation 440, for a blind detection result at each UL transmission ending time point, when the blind detection result at any UL transmission ending time point includes successful demodulation, the first information indicating successful demodulation is sent to the terminal at the HARQ feedback time point.

In an embodiment, the blind detection result at each UL transmission ending time point may be successful demodulation or unsuccessful demodulation. As shown in FIG. 3B, when a blind detection result of the possible UL transmission ending time point #1 is unsuccessful demodulation, a blind detection result of the possible UL transmission ending time point #2 is successful demodulation, a blind detection result of the possible UL transmission ending time point #3 is unsuccessful demodulation, and a blind detection result of the possible UL transmission ending time point #4 is unsuccessful demodulation, the first information indicating successful demodulation may be sent to the terminal at the determined HARQ feedback time point.

In operation 450, when each blind detection result does not include successful demodulation, the second information indicating unsuccessful demodulation is sent to the terminal at the HARQ feedback time point.

In the embodiment, the blind detection result may be successful demodulation or unsuccessful demodulation. As shown in FIG. 3B, when the blind detection result of the possible UL transmission ending time point #1 is unsuccessful demodulation, the blind detection result of the possible UL transmission ending time point #2 is unsuccessful demodulation, the blind detection result of the possible UL transmission ending time point #3 is unsuccessful demodulation, and the blind detection result of the possible UL transmission ending time point #4 is unsuccessful demodulation, the second information indicating unsuccessful demodulation may be sent to the terminal at the determined HARQ feedback time point.

In the embodiment, when the preset rule is that a HARQ feedback is made based on the maximum UL transmission repetition count, the maximum UL transmission repetition count may be determined based on the UL transmission repetition count in each available scheduling resource. The UL transmission ending time point corresponding to the maximum UL transmission repetition count may be determined. The HARQ feedback time point may be determined based on the UL transmission ending time point corresponding to the maximum UL transmission repetition count. The determined HARQ feedback time point may be at a specified position after the UL transmission ending time point corresponding to the maximum UL transmission repetition count. Accordingly, a function of performing HARQ feedback based on the maximum UL transmission repetition count is realized, the terminal can receive correct HARQ information, and the quality of service of HARQ feedback is also improved.

FIG. 5A is a flowchart of a HARQ feedback method according to an exemplary embodiment. The HARQ feedback method may be applied to a base station that allocates multiple available scheduling resources configured to provide EDT service to a terminal. Based on the method shown in FIG. 1, the preset rule is that a HARQ feedback is made for the UL transmission ending time point respectively for each available scheduling resource. When operation 120 is executed, as shown in FIG. 5A, the following operation may be included.

In operation 510, for any UL transmission ending time point, a HARQ feedback time point corresponding to the UL transmission ending time point is determined, the determined HARQ feedback time point being at a specified position after the UL transmission ending time point.

In an embodiment, for each UL transmission ending time point, the base station is configured to determine a HARQ feedback time point corresponding to the UL transmission ending time point. For example, as shown in FIG. 3B, the four possible UL transmission ending time points may be the possible UL transmission ending time point #1, the possible UL transmission ending time point #2, the possible UL transmission ending time point #3, and the possible UL transmission ending time point #4, respectively. The base station is configured to determine respective HARQ feedback time points corresponding to the four possible UL transmission ending time points.

In addition, a specified position after each UL transmission ending time point may be a preset fixed value or a numerical value determined by the base station according to the actual condition. For example, the specified position is a specified number of subframes.

Figure 5B:
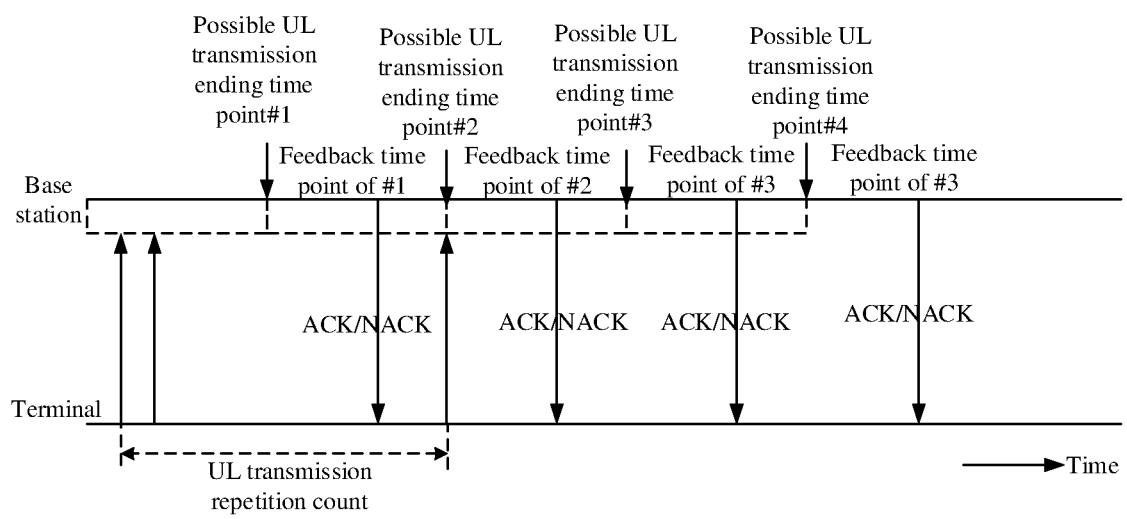
FIG. 5B is an information interaction diagram of a HARQ feedback method according to an exemplary embodiment.

For example, the specified position may be a position after the specified number of subframes. In such case, the determined HARQ feedback time points are positions after the specified number of subframes after the UL transmission ending time points, i.e., a HARQ feedback time point of #1, a HARQ feedback time point of #2, a HARQ feedback time point of #3, and a HARQ feedback time point of #4 in FIG. 5B. Acknowledgement (ACK) is the first information indicating successful demodulation, and Negative Acknowledgement (NACK) is the second information indicating unsuccessful demodulation.

Figure 5C:
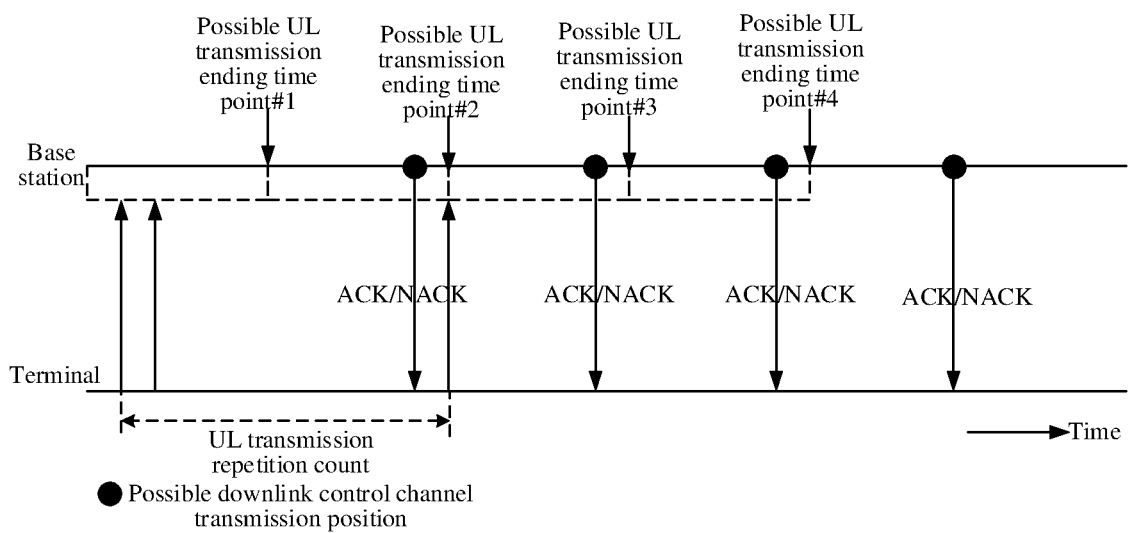
FIG. 5C is an information interaction diagram of a HARQ feedback method according to an exemplary embodiment.

For another example, the specified position may be a first downlink control channel transmission position after the specified number of subframes. In such case, the determined HARQ feedback time points are first downlink control channel transmission positions after the specified number of subframes after respective UL transmission ending time points, i.e., a possible downlink control channel transmission position of #1, a possible downlink control channel transmission position of #2, a possible downlink control channel transmission position of #3, and a possible downlink control channel transmission position of #4 in FIG. 5C. ACK is the first information indicating successful demodulation, and NACK is the second information indicating unsuccessful demodulation.

In an embodiment, the specified position may be configured by the base station and may be in a UL grant in an RAR sent to the terminal by the base station. That is, the base station may add the specified position to the UL grant in the RAR and send the RAR to the terminal. Then, the terminal may determine the specified position configured by the base station according to the RAR. In another embodiment, the preset rule includes third information indicating the specified position, and the third information indicates a relative relationship between a HARQ feedback time point and a determined UL transmission ending time point. That is, a specific content of the specified position is fixedly written in the preset rule. Accordingly, both the base station and the terminal can determine the specified position based on the third information in the preset rule.

In an embodiment, the HARQ information about the blind detection may include first information indicating successful demodulation or second information indicating unsuccessful demodulation. When operation 130 is executed, as shown in FIG. 5A, the following operations may be included.

In operation 520, for a blind detection result of any UL transmission ending time point, when the blind detection result is successful demodulation, the first information indicating successful demodulation is sent to the terminal at the HARQ feedback time point corresponding to the UL transmission ending time point.

In operation 530, when the blind detection result is unsuccessful demodulation, the second information indicating unsuccessful demodulation is sent to the terminal at the HARQ feedback time point corresponding to the UL transmission ending time point.

In the embodiment, when the preset rule is that a HARQ feedback is made for the UL transmission ending time point respectively for each available scheduling resource, the HARQ feedback time point corresponding to each UL transmission ending time point may be determined at first. For a blind detection result at any UL transmission ending time point, when the blind detection result is successful demodulation, the first information indicating successful demodulation may be sent to the terminal at the HARQ feedback time point corresponding to the UL transmission ending time point. When the blind detection result is unsuccessful demodulation, the second information indicating unsuccessful demodulation may be sent to the terminal at the HARQ feedback time point corresponding to the UL transmission ending time point. Accordingly, a function of performing HARQ feedback for each UL transmission ending time point respectively for each available scheduling resource is realized, the terminal can receive the correct HARQ information, and a service style of HARQ feedback is further enriched.

FIG. 6A is a flowchart of a HARQ feedback method according to an exemplary embodiment. The HARQ feedback method may be applied to a base station that allocates multiple available scheduling resources configured to provide EDT service to a terminal. Based on the method shown in FIG. 3A, the preset rule is that a HARQ feedback is made only when the blind detection result is successful demodulation. When operation 120 is executed, as shown in FIG. 6A, the following operation may be included.

In operation 610, for any UL transmission ending time point, a HARQ feedback time point corresponding to the UL transmission ending time point is determined, the determined HARQ feedback time point being at a specified position after the UL transmission ending time point.

In an embodiment, for each UL transmission ending time point, the base station is configured to determine each HARQ feedback time point corresponding to each UL transmission ending time point. For example, as shown in FIG. 3B, the four possible UL transmission ending time points may be the possible UL transmission ending time point #1, the possible UL transmission ending time point #2, the possible UL transmission ending time point #3, and the possible UL transmission ending time point #4, respectively. The base station is configured to determine respective HARQ feedback time points corresponding to the four possible UL transmission ending time points.

In addition, a specified position after each UL transmission ending time point may be a preset fixed value or a numerical value determined by the base station according to the actual condition. For example, the specified position may be a specified number of subframes.

Figure 6B:
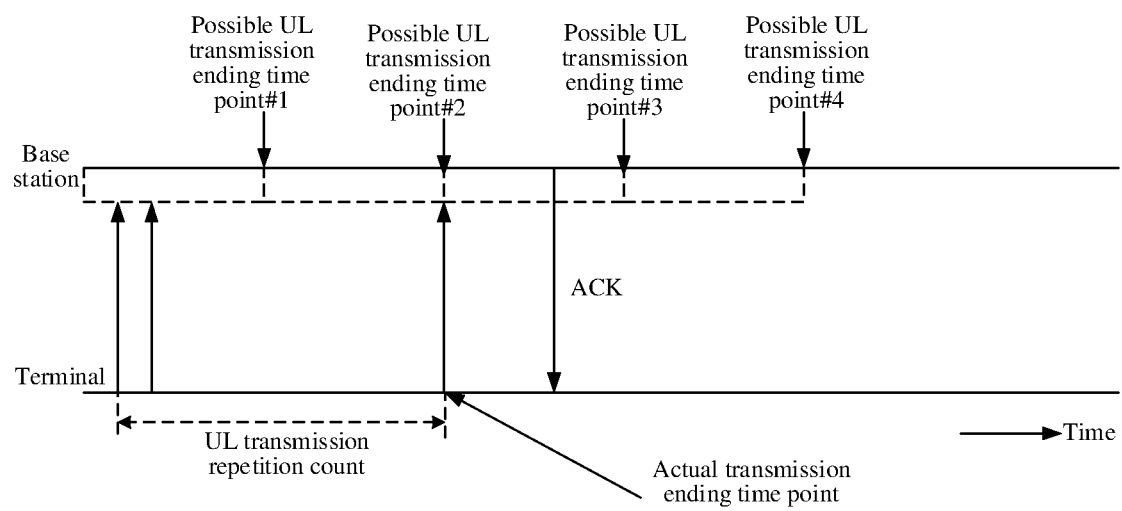
FIG. 6B is an information interaction diagram of a HARQ feedback method according to an exemplary embodiment.

For example, the specified position may be a position after the specified number of subframes. In such case, the determined HARQ feedback time points are positions after the specified number of subframes after respective UL transmission ending time points. The possible UL transmission ending time point #2 shown in FIG. 6B is an actual transmission ending time point. ACK is the first information indicating successful demodulation. That is, only when the blind detection result at the possible UL transmission ending time point #2 is successful demodulation, the first information indicating successful demodulation, i.e., the ACK, is sent to the terminal at a position after the specified number of subframes.

Figure 6C:
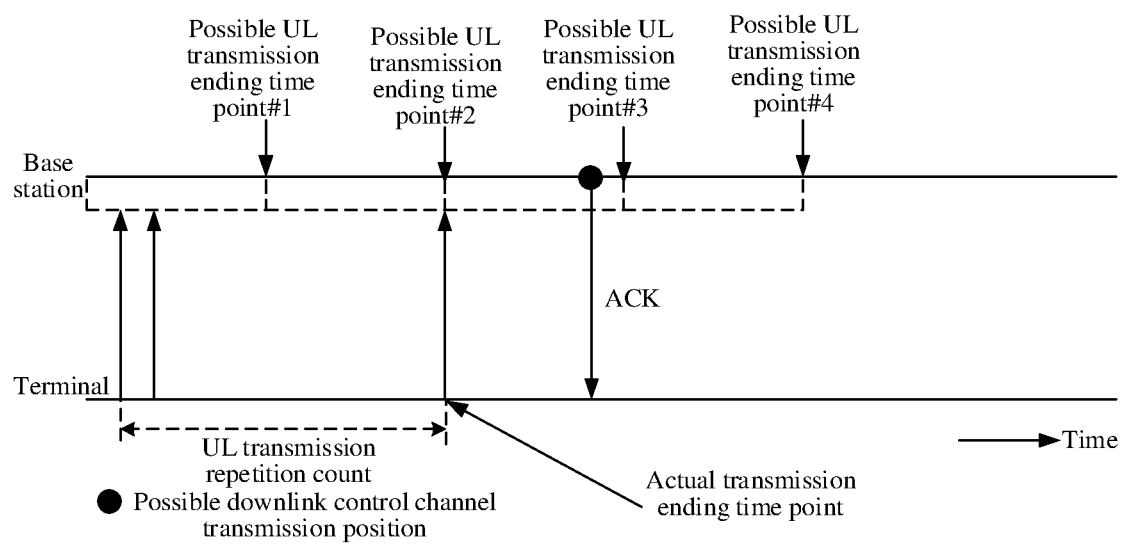
FIG. 6C is an information interaction diagram of a HARQ feedback method according to an exemplary embodiment.

For another example, the specified position may be a first downlink control channel transmission position after the specified number of subframes. In such case, the determined HARQ feedback time points are first downlink control channel transmission positions after the specified number of subframes after respective UL transmission ending time points. The possible UL transmission ending time point #2 shown in FIG. 6C is an actual transmission ending time point. ACK is the first information indicating successful demodulation. That is, only when the blind detection result at the possible UL transmission ending time point #2 is successful demodulation, the first information indicating successful demodulation, i.e., the ACK, is sent to the terminal at a possible downlink control channel transmission position.

In an embodiment, the specified position may be configured by the base station and may be in a UL grant in an RAR sent to the terminal by the base station. That is, the base station may add the specified position to the UL grant in the RAR and send the RAR to the terminal. Then, the terminal may determine the specified position configured by the base station according to the RAR. In another embodiment, the preset rule includes third information indicating the specified position, and the third information indicates a relative relationship between a HARQ feedback time point and a determined UL transmission ending time point. That is, a specific content of the specified position is fixedly written in the preset rule. Accordingly, both the base station and the terminal can determine the specified position based on the third information in the preset rule.

In an embodiment, the HARQ information about the blind detection may include the first information indicating successful demodulation. When operation 130 is executed, as shown in FIG. 6A, the following operations may be included.

In operation 620, for a blind detection result at any UL transmission ending time point, when the blind detection result is successful demodulation, the first information representing successful demodulation is sent to the terminal at the HARQ feedback time point corresponding to the UL transmission ending time point.

In operation 630, when the blind detection result is unsuccessful demodulation, HARQ feedback is not made at the HARQ feedback time point corresponding to the UL transmission ending time point.

In the embodiment, when the preset rule is that a HARQ feedback is made only when the blind detection result is successful demodulation, each HARQ feedback time point corresponding to each UL transmission ending time point may be determined at first. For a blind detection result at any UL transmission ending time point, when the blind detection result is successful demodulation, the first information representing successful demodulation is sent to the terminal at the HARQ feedback time point corresponding to the UL transmission ending time point. When the blind detection result is unsuccessful demodulation, HARQ feedback is not made at the HARQ feedback time point corresponding to the UL transmission ending time point. Accordingly, a function of performing HARQ feedback only when the blind detection result is successful demodulation is realized, and on the premise of ensuring that the terminal can receive the correct HARQ information, a HARQ feedback content and a feedback frequency are reduced and the HARQ feedback efficiency is improved.

Figure 7:
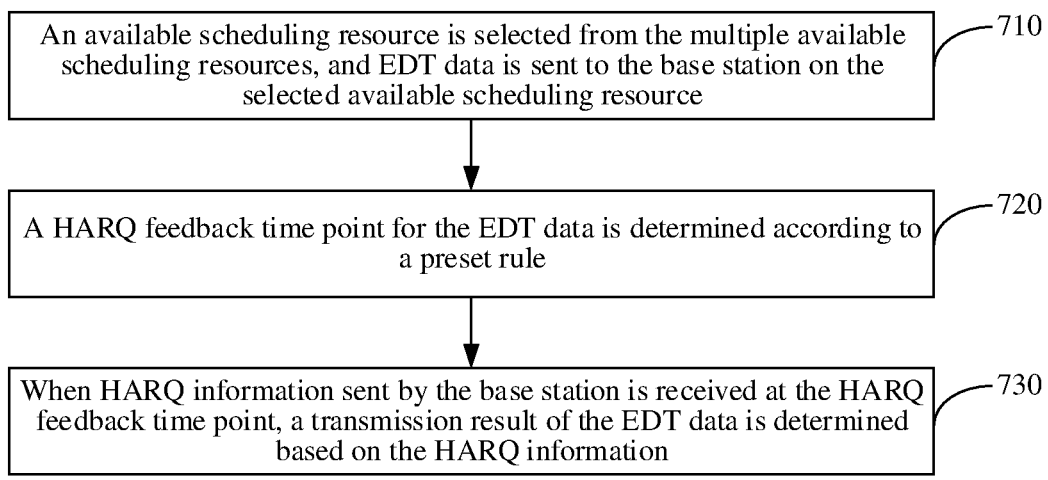
FIG. 7 is a flowchart of a HARQ feedback method according to an exemplary embodiment.

FIG. 7 is a flowchart of a HARQ feedback method according to an exemplary embodiment. The HARQ feedback method may be applied to a terminal. A base station may allocate, to the terminal, multiple available scheduling resources configured to provide EDT service. As shown in FIG. 7, the HARQ feedback method may include the following operations.

In operation 710, an available scheduling resource is selected from the multiple available scheduling resources, and EDT data is sent to the base station on the selected available scheduling resource.

In an embodiment, the EDT data may be UL data required to be transmitted by the terminal in a random access process and may be in a message 3 in the random access process. That is, the terminal may add the EDT data to the message 3 and send the message 3 to the base station such that the base station can acquire the EDT data transmitted by the terminal from the message 3.

In operation 720, a HARQ feedback time point for the EDT data is determined according to a preset rule.

In an embodiment, for meeting different requirements of the base station and the terminal, the predefined preset rule may include, but not limited to, the following three examples, but the base station and the terminal may negotiate about the specific preset rule to be adopted by the base station and the terminal in advance.

Figure 9:
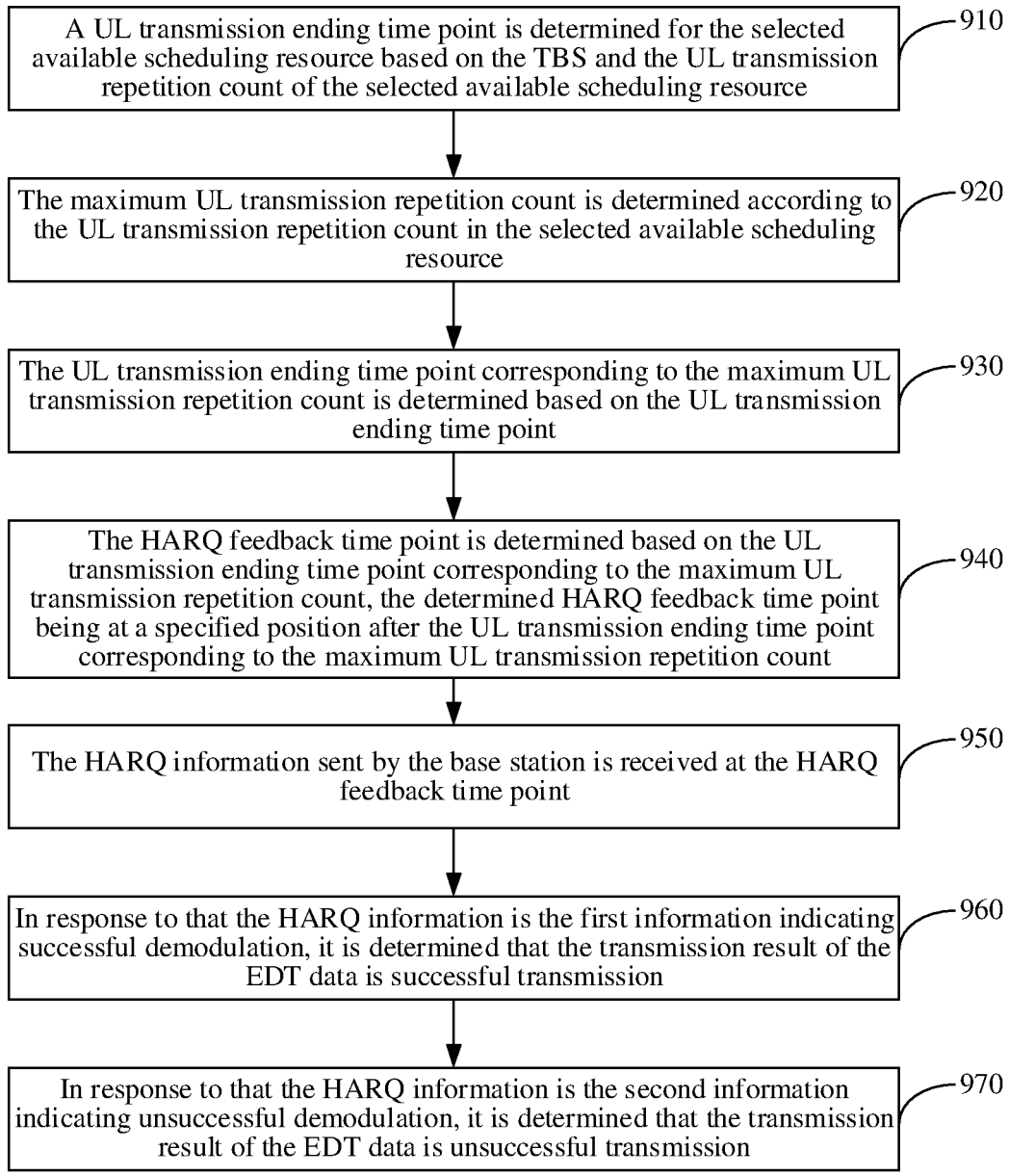
FIG. 9 is a flowchart of a HARQ feedback method according to an exemplary embodiment.

In a first example, the preset rule is that a HARQ feedback is made based on a maximum UL transmission repetition count. Details about an exemplary implementation process is illustrated in FIG. 9.

Figure 10:
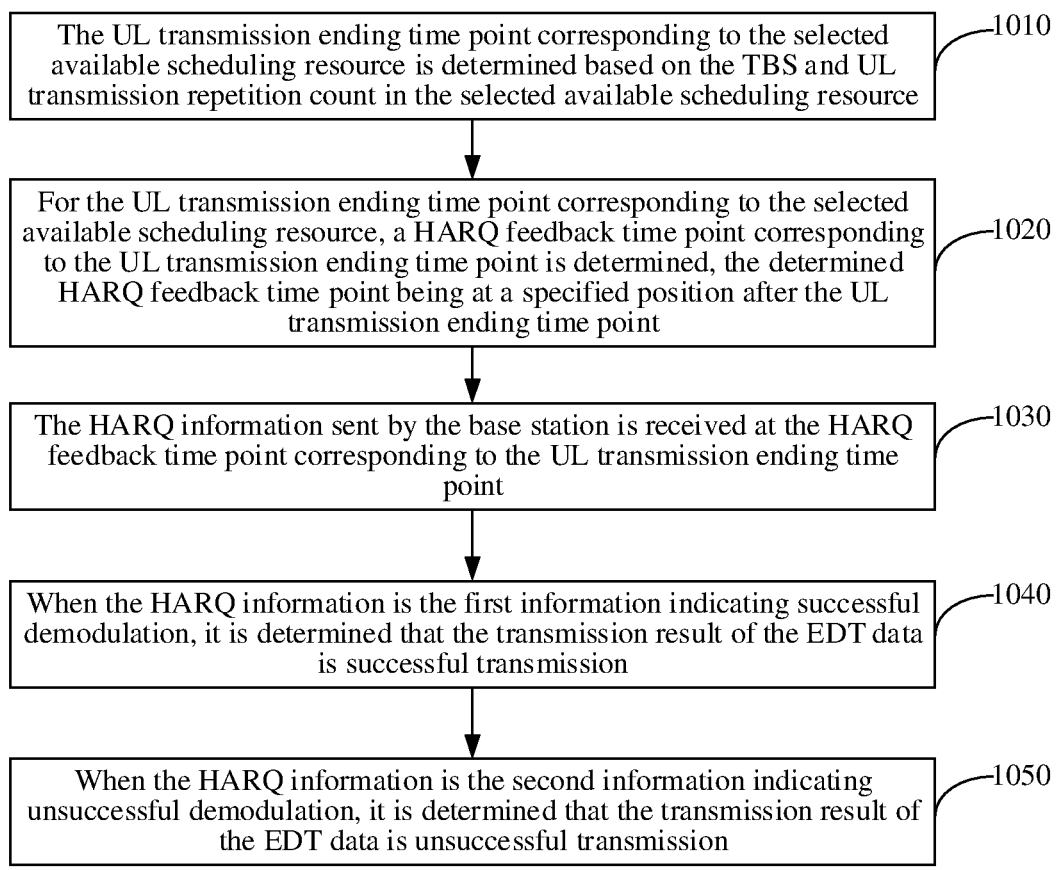
FIG. 10 is a flowchart of a HARQ feedback method according to an exemplary embodiment.

In a second example, the preset rule is that a HARQ feedback is made for each UL transmission ending time point respectively for each available scheduling resource. Details about an exemplary implementation process is illustrated in FIG. 10.

Figure 11:
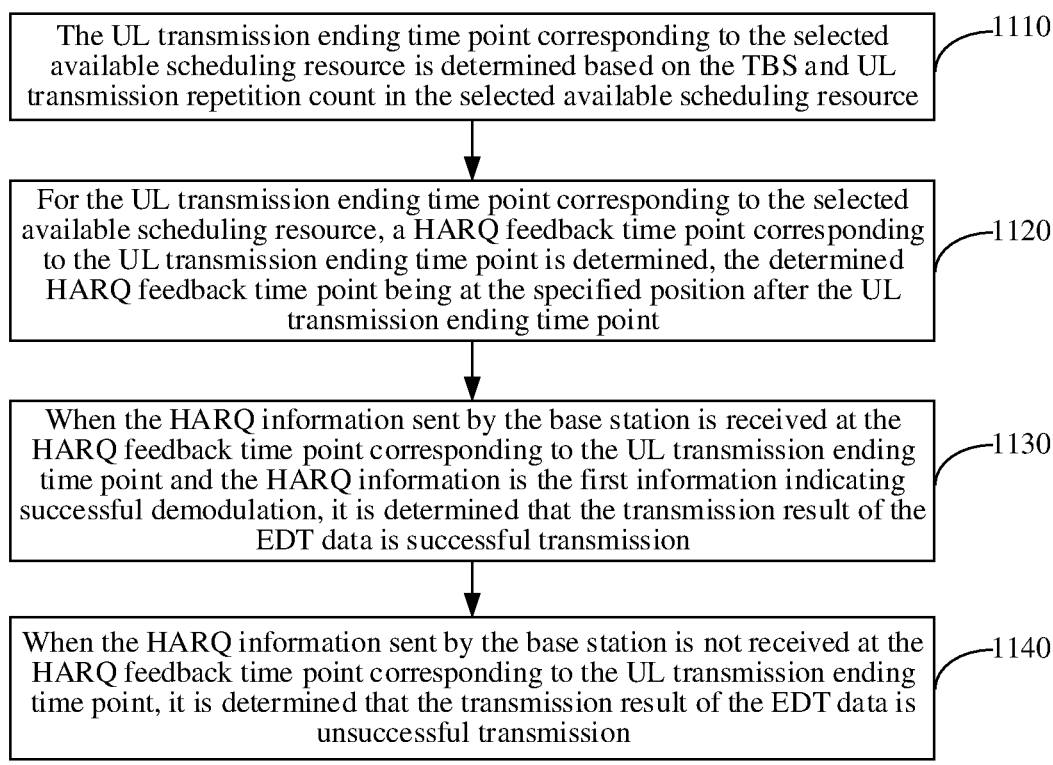
FIG. 11 is a flowchart of a HARQ feedback method according to an exemplary embodiment.

In a third example, the preset rule is that a HARQ feedback is made only when a blind detection result is successful demodulation. Details about an exemplary implementation process is illustrated in FIG. 11.

In operation 730, when HARQ information sent by the base station is received at the HARQ feedback time point, a transmission result of the EDT data is determined based on the HARQ information.

In the embodiment, an available scheduling resource may be selected from the multiple available scheduling resources, the EDT data may be sent to the base station on the selected available scheduling resource, the HARQ feedback time point for the EDT data may be determined according to the preset rule. In response to that the HARQ information sent by the base station is received at the HARQ feedback time point, the transmission result of the EDT data may be determined based on the HARQ information. Accordingly, the HARQ feedback reliability is improved, and the EDT efficiency is also improved.

Figure 8:
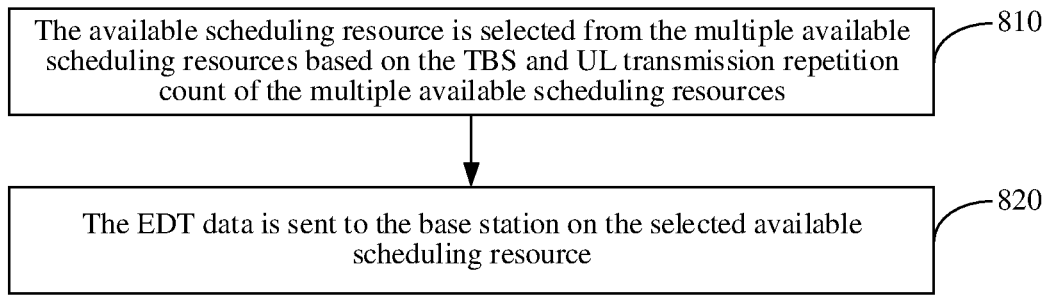
FIG. 8 is a flowchart of a HARQ feedback method according to an exemplary embodiment.

FIG. 8 is a flowchart of a HARQ feedback method according to an exemplary embodiment. The HARQ feedback method may be applied to a terminal. A base station may allocate multiple available scheduling resources configured to provide EDT service to the terminal. Based on the method shown in FIG. 7, the available scheduling resource includes a TBS and a UL transmission repetition count. When operation 710 is executed, as shown in FIG. 8, the following operations may be included.

In operation 810, the available scheduling resource is selected from the multiple available scheduling resources based on the TBS and UL transmission repetition count of the multiple available scheduling resources.

In operation 820, the EDT data is sent to the base station on the selected available scheduling resource.

In the embodiment, an available scheduling resource may be selected from the multiple available scheduling resources based on the TBS and UL transmission repetition count in each available scheduling resource and the EDT data may be sent to the base station on the selected available scheduling resource. Accordingly, the available scheduling resource may be selected accurately.

FIG. 9 is a flowchart of a HARQ feedback method according to an exemplary embodiment. The HARQ feedback method may be applied to a terminal. A base station may allocate multiple available scheduling resources configured to provide EDT service to the terminal. Based on the method shown in FIG. 8, the preset rule is that a HARQ feedback is made based on the maximum UL transmission repetition count. When operation 720 is executed, as shown in FIG. 9, the following operations may be included.

In operation 910, a UL transmission ending time point is determined for the selected available scheduling resource based on the TBS and the UL transmission repetition count of the selected available scheduling resource.

In operation 920, the maximum UL transmission repetition count is determined according to the UL transmission repetition count in the selected available scheduling resource.

In operation 930, the UL transmission ending time point corresponding to the maximum UL transmission repetition count is determined based on the UL transmission ending time point.

In operation 940, the HARQ feedback time point is determined based on the UL transmission ending time point corresponding to the maximum UL transmission repetition count, the determined HARQ feedback time point being at a specified position after the UL transmission ending time point corresponding to the maximum UL transmission repetition count.

In an embodiment, the specified position may be configured by the base station and may be in a UL grant in an RAR sent to the terminal by the base station. That is, the base station may add the specified position to the UL grant in the RAR and send the RAR to the terminal. Thus, the terminal may determine the specified position configured by the base station according to the RAR. In another embodiment, the preset rule includes third information indicating the specified position, and the third information indicates a relative relationship between a HARQ feedback time point and a determined UL transmission ending time point. That is, a specific content of the specified position is fixedly written in the preset rule. Accordingly, both the base station and the terminal may determine the specified position based on the third information in the preset rule.

In an embodiment, the HARQ information may include first information indicating successful demodulation or second information indicating unsuccessful demodulation. When operation 730 is executed, as shown in FIG. 9, the following operations may be included.

In operation 950, the HARQ information sent by the base station is received at the HARQ feedback time point.

In operation 960, in response to that the HARQ information is the first information indicating successful demodulation, it is determined that the transmission result of the EDT data is successful transmission.

In operation 970, in response to that the HARQ information is the second information indicating unsuccessful demodulation, it is determined that the transmission result of the EDT data is unsuccessful transmission.

In the embodiment, when the preset rule is that a HARQ feedback is made based on the maximum UL transmission repetition count, the maximum UL transmission repetition count may be determined based on the TBS and UL transmission repetition count in each available scheduling resource, each UL transmission ending time point may be determined respectively for each available scheduling resource, the UL transmission ending time point corresponding to the maximum UL transmission repetition count may be determined, and the HARQ feedback time point may be determined based on the UL transmission ending time point corresponding to the maximum UL transmission repetition count, the determined HARQ feedback time point being at a specified position after the UL transmission ending time point corresponding to the maximum UL transmission repetition count. Accordingly, a function of performing HARQ feedback based on the maximum UL transmission repetition count is realized, the terminal can receive correct HARQ information, and the quality of service of HARQ feedback is also improved.

FIG. 10 is a flowchart of a HARQ feedback method according to an exemplary embodiment. The HARQ feedback method may be applied to a terminal. A base station may allocate multiple available scheduling resources configured to provide EDT service to the terminal. Based on the method shown in FIG. 8, the preset rule is that a HARQ feedback is made for each UL transmission ending time point respectively for each available scheduling resource. When operation 720 is executed, as shown in FIG. 10, the following operations may be included.

In operation 1010, the UL transmission ending time point corresponding to the selected available scheduling resource is determined based on the TBS and UL transmission repetition count in the selected available scheduling resource.

In operation 1020, for the UL transmission ending time point corresponding to the selected available scheduling resource, a HARQ feedback time point corresponding to the UL transmission ending time point is determined, the determined HARQ feedback time point being at a specified position after the UL, transmission ending time point.

In an embodiment, the specified position may be configured by the base station and is in a UL grant in an RAR sent to the terminal by the base station. That is, the base station may add the specified position to the UL grant in the RAR and send the RAR to the terminal. Thus, the terminal may determine the specified position configured by the base station according to the RAR. In another embodiment, the preset rule includes third information indicating the specified position, and the third information indicates a relative relationship between a HARQ feedback time point and a determined UL transmission ending time point. That is, a specific content of the specified position is fixedly written in the preset rule. Accordingly, both the base station and the terminal can determine the specified position based on the third information n the preset rule.

In an embodiment, the HARQ information may include first information indicating successful demodulation or second information indicating unsuccessful demodulation. When operation 730 is executed, as shown in FIG. 10, the following operations may be included.

In operation 1030, the HARQ information sent by the base station is received at the HARQ feedback time point corresponding to the UL transmission ending time point.

In operation 1040, when the HARQ information is the first information indicating successful demodulation, it is determined that the transmission result of the EDT data is successful transmission.

In operation 1050, when the HARQ information is the second information indicating unsuccessful demodulation, it is determined that the transmission result of the EDT data is unsuccessful transmission.

In the embodiment, when the preset rule is that a HARQ feedback is made for each UL transmission ending time point respectively for each available scheduling resource, a UL transmission ending time point corresponding to the selected available scheduling resource and a HARQ feedback time point corresponding to the UL transmission ending time point may be determined only. HARQ information sent by the base station may be received at the HARQ feedback time point corresponding to the UL transmission ending time point. When the HARQ information is the first information indicating successful demodulation, it can be determined that the transmission result of the EDT data is successful transmission. When the HARQ information is the second information indicating unsuccessful demodulation, it can be determined that the transmission result of the EDT data is unsuccessful transmission. Accordingly, the accuracy of the transmission result is improved.

FIG. 11 is a flowchart of a HARQ feedback method according to an exemplary embodiment. The HARQ feedback method may be applied to a terminal. A base station may allocate multiple available scheduling resources configured to provide EDT service to the terminal. Based on the method shown in FIG. 8, the preset rule is that a HARQ feedback is made only when a blind detection result is successful demodulation. When operation 720 is executed, as shown in FIG. 11, the following operations may be included.

In operation 1110, the UL transmission ending time point corresponding to the selected available scheduling resource is determined based on the TBS and UL transmission repetition count in the selected available scheduling resource.

In operation 1120, for the UL transmission ending time point corresponding to the selected available scheduling resource, a HARQ feedback time point corresponding to the UL transmission ending time point is determined, the determined HARQ feedback time point being at the specified position after the UL transmission ending time point.

In an embodiment, the specified position may be configured by the base station and may be in a UL grant in an RAR sent to the terminal by the base station. That is, the base station may add the specified position to the UL grant in the RAR and send the RAR to the terminal. Thus, the terminal may determine the specified position configured by the base station according to the RAR. In another embodiment, the preset rule includes third information indicating the specified position, and the third information indicates a relative relationship between a HARQ feedback time point and a determined UL transmission ending time point. That is, a specific content of the specified position is fixedly written in the preset rule. Accordingly, both the base station and the terminal may determine the specified position based on the third information in the preset rule.

In an embodiment, the HARQ information may include the first information indicating successful demodulation. When operation 730 is executed, as shown in FIG. 11, the following operations may be included.

In operation 1130, when the HARQ information sent by the base station is received at the HARQ feedback time point corresponding to the UL transmission ending time point and the HARQ information is the first information indicating successful demodulation, it is determined that the transmission result of the EDT data is successful transmission.

In operation 1140, when the HARQ information sent by the base station is not received at the HARQ feedback time point corresponding to the UL transmission ending time point, it is determined that the transmission result of the EDT data is unsuccessful transmission.

In the embodiment, when the preset rule is that a HARQ feedback is made only when the blind detection result is successful demodulation, the UL transmission ending time point corresponding to the selected available scheduling resource and the HARQ feedback time point corresponding to the UL transmission ending time point may be determined only. When the HARQ information sent by the base station is received at the HARQ feedback time point corresponding to the UL transmission ending time point and the HARQ information is the first information indicating successful demodulation, it may be determined that the transmission result of the EDT data is successful transmission. When the HARQ information is not received at the HARQ feedback time point corresponding to the UL transmission ending time point, it may be determined that the transmission result of the EDT data is unsuccessful transmission. Accordingly, the accuracy of the transmission result is ensured, in addition, a HARQ feedback content and a feedback frequency are also reduced, and the HARQ feedback efficiency is improved.

Corresponding to the embodiments of the HARQ feedback methods, the present disclosure also provides embodiments of HARQ feedback apparatuses.

Figure 12:
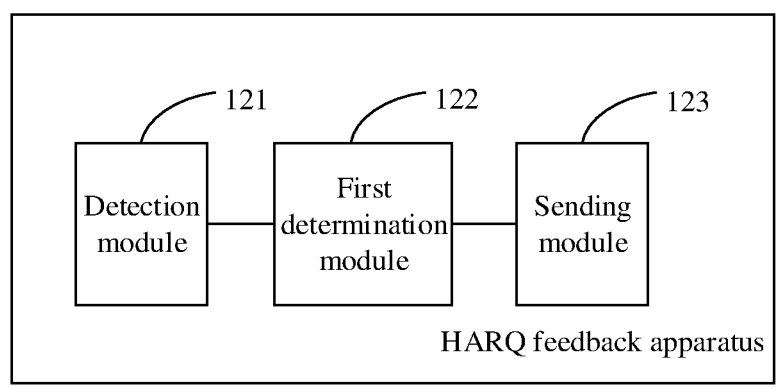
FIG. 12 is a block diagram of a HARQ feedback apparatus according to an exemplary embodiment.

FIG. 12 is a block diagram of a HARQ feedback apparatus according to an exemplary embodiment. The apparatus may be applied to a base station that allocates, to a terminal, multiple available scheduling resources configured to provide EDT service. The base station is configured to execute the HARQ feedback method in FIG. 1. As shown in FIG. 12, the HARQ feedback apparatus may include: a detection module 121, configured to perform blind detection on EDT data transmitted to the base station by the terminal on respective available scheduling resources; a first determination module 122, configured to determine a HARQ feedback time point for the blind detection according to a preset rule; and a sending module 123, configured to send HARQ information about the blind detection to the terminal at the HARQ feedback time point.

In the embodiment, blind detection may be performed on the EDT data transmitted to the base station by the terminal on each available scheduling resource, the HARQ feedback time point for the blind detection may be determined according to the preset rule, the HARQ information about the blind detection may be sent to the terminal at the HARQ feedback time point. Thus, the terminal may receive the HARQ information from the base station at the HARQ feedback time point determined according to the preset rule and determine a correct transmission result of the EDT data based on the HARQ information. Accordingly, the HARQ feedback reliability is improved, and the EDT efficiency is also improved.

In an embodiment, based on the apparatus shown in FIG. 12, the EDT data may be UL data transmitted by the terminal in a random access process and may be in a message 3 in the random access process.

Figure 13:
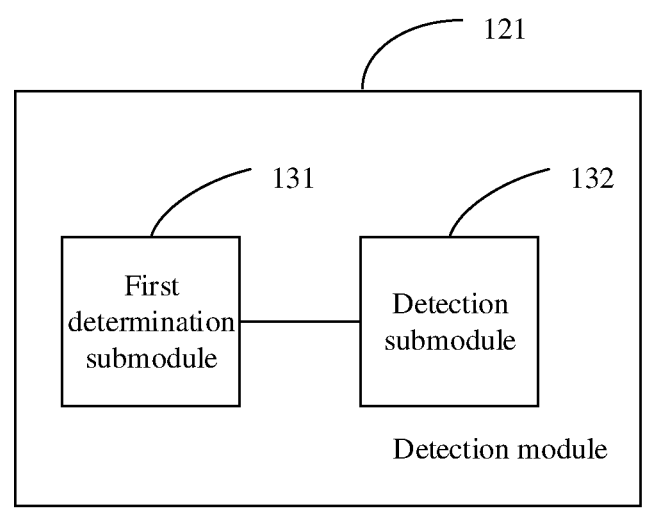
FIG. 13 is a block diagram of a HARQ feedback apparatus according to an exemplary embodiment.

In an embodiment, based on the apparatus shown in FIG. 12, the available scheduling resource may include a TBS and a UL transmission repetition count. As shown in FIG. 13, the detection module 121 may include: a first determination submodule 131, configured to determine UL transmission ending time points for respective available scheduling resources based on the TBS and the UL transmission repetition count in respective available scheduling resources; and a detection submodule 132, configured to perform blind detection on the EDT data at respective UL transmission ending time points.

In the embodiment, the UL transmission ending time point may be determined respectively for each available scheduling resource based on the TBS and UL transmission repetition count in each available scheduling resource and blind detection may be performed on the EDT data at each UL transmission ending time point. Accordingly, the blind detection accuracy is improved.

Figure 14:
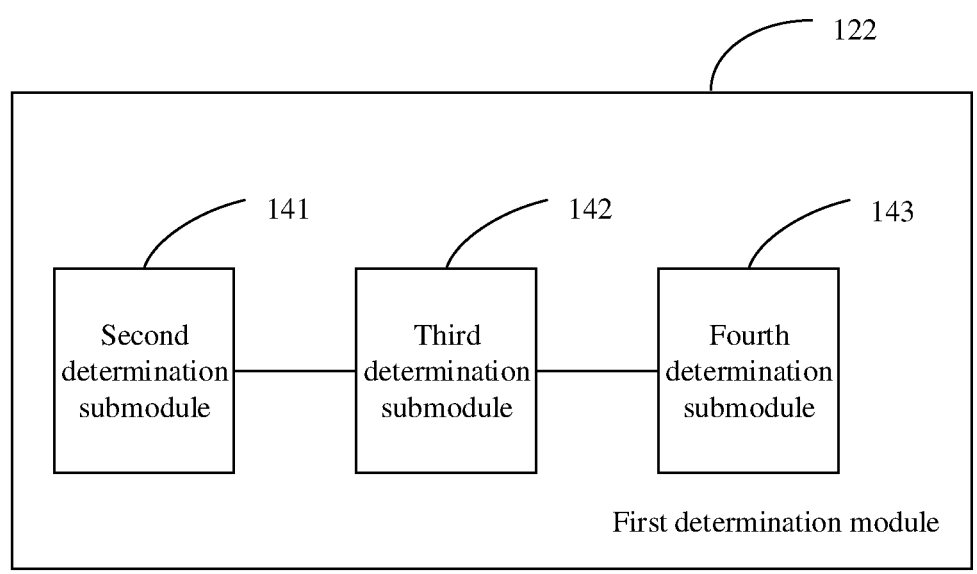
FIG. 14 is a block diagram of a HARQ feedback apparatus according to an exemplary embodiment.

In an embodiment, based on the apparatus shown in FIG. 13, the preset rule is that a HARQ feedback is made based on a maximum UL transmission repetition count. As shown in FIG. 14, the first determination module 122 may include: a second determination submodule 141, configured to determine the maximum UL transmission repetition count according to the UL transmission repetition count in a respective available scheduling resource; a third determination submodule 142, configured to determine a UL transmission ending time point corresponding to the maximum UL transmission repetition count based on a respective UL transmission ending time point; and a fourth determination submodule 143, configured to determine the HARQ feedback time point based on the UL transmission ending time point corresponding to the maximum UL transmission repetition count, the determined HARQ feedback time point being at a specified position after the UL transmission ending time point corresponding to the maximum UL transmission repetition count.

Figure 15:
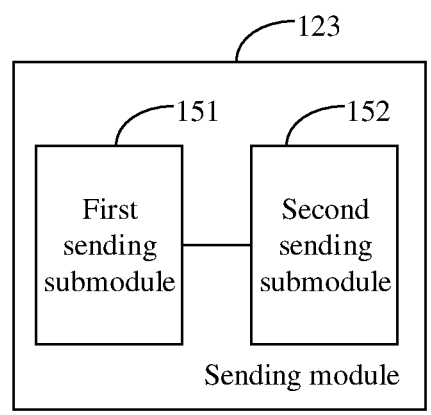
FIG. 15 is a block diagram of a HARQ feedback apparatus according to an exemplary embodiment.

In an embodiment, based on the apparatus shown in FIG. 14, the HARQ information about the blind detection may include first information indicating successful demodulation or second information indicating unsuccessful demodulation. As shown in FIG. 15, the sending module 123 may include: a first sending submodule 151, configured to, for each blind detection result at each UL transmission ending time point, when each blind detection result includes successful demodulation, send the first information to the terminal at the HARQ feedback time point; and a second sending submodule 152, configured to, when each blind detection result does not include successful demodulation, send the second information to the terminal at the HARQ feedback time point.

In the embodiment, when the preset rule is that a HARQ feedback is made based on the maximum UL transmission repetition count, the maximum UL transmission repetition count may be determined according to the UL transmission repetition count in each available scheduling resource. The UL transmission ending time point corresponding to the maximum UL transmission repetition count may be determined and the HARQ feedback time point may be determined based on the UL transmission ending time point corresponding to the maximum UL transmission repetition count, the determined HARQ feedback time point being at a specified position after the UL transmission ending time point corresponding to the maximum UL transmission repetition count. Accordingly, a function of performing HARQ feedback based on the maximum UL transmission repetition count is realized, the terminal can receive correct HARQ information, and the quality of service of HARQ feedback is also improved.

Figure 16:
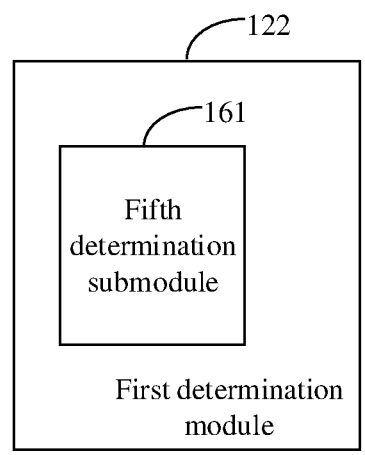
FIG. 16 is a block diagram of a HARQ feedback apparatus according to an exemplary embodiment.

In an embodiment, based on the apparatus shown in FIG. 13, the preset rule is that a HARQ feedback is made for each UL transmission ending time point respectively for each available scheduling resource. As shown in FIG. 16, the first determination module 122 may include: a fifth determination submodule 161, configured to, for any UL transmission ending time point, determine a HARQ feedback time point corresponding to the UL transmission ending time point, the determined HARQ feedback time point being at a specified position after the UL transmission ending time point.

Figure 17:
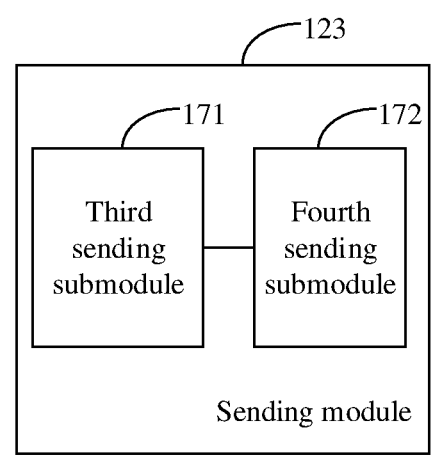
FIG. 17 is a block diagram of a HARQ feedback apparatus according to an exemplary embodiment.

In an embodiment, based on the apparatus shown in FIG. 16, as shown in FIG. 17, the sending module 123 may include: a third sending submodule 171, configured to, for a blind detection result at any UL transmission ending time point, when the blind detection result is successful demodulation, send the first information to the terminal at the HARQ feedback time point corresponding to the UL transmission ending time point; and a fourth sending submodule 172, configured to, when the blind detection result is unsuccessful demodulation, send the second information to the terminal at the HARQ feedback time point corresponding to the UL transmission ending time point.

In the embodiment, when the preset rule is that a HARQ feedback is made for each UL transmission ending time point respectively for each available scheduling resource, each HARQ feedback time point corresponding to each UL transmission ending time point may be determined at first. For a blind detection result at any UL transmission ending time point, when the blind detection result is successful demodulation, the first information indicating successful demodulation may be sent to the terminal at the HARQ feedback time point corresponding to the UL transmission ending time point. When the blind detection result is unsuccessful demodulation, the second information indicating unsuccessful demodulation may be sent to the terminal at the HARQ feedback time point corresponding to the UL transmission ending time point. Accordingly, a function of performing HARQ feedback for each UL transmission ending time point respectively for each available scheduling resource is realized, the terminal can receive the correct HARQ information, and a service style of HARQ feedback is further enriched.

Figure 18:
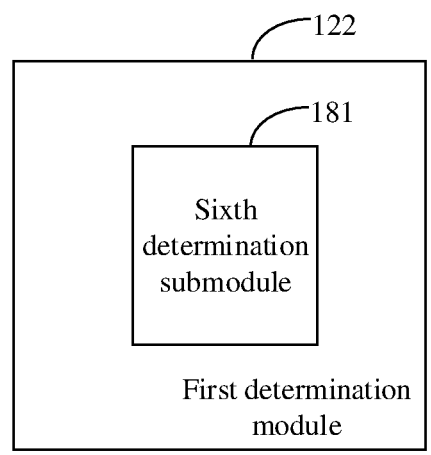
FIG. 18 is a block diagram of a HARQ feedback apparatus according to an exemplary embodiment.

In an embodiment, based on the apparatus shown in FIG. 13, the preset rule is that a HARQ feedback is made only when the blind detection result is successful demodulation. As shown in FIG. 18, the first determination module 122 may include: a sixth determination submodule 181, configured to, for any UL transmission ending time point, determine a HARQ feedback time point corresponding to the UL transmission ending time point, the determined HARQ feedback time point being at a specified position after the UL transmission ending time point.

Figure 19:
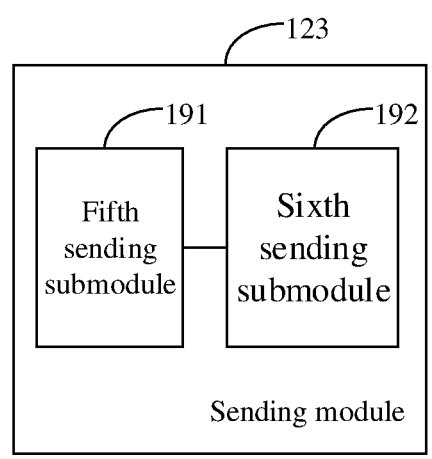
FIG. 19 is a block diagram of a HARQ feedback apparatus according to an exemplary embodiment.

In an embodiment, based on the apparatus shown in FIG. 18, as shown in FIG. 19, the sending module 123 may include: a fifth sending submodule 191, configured to, for a blind detection result at any UL transmission ending time point, when the blind detection result is successful demodulation, send the first information to the terminal at the HARQ feedback time point corresponding to the UL transmission ending time point; and a sixth sending submodule 192, configured to, when the blind detection result is unsuccessful demodulation, not perform HARQ feedback at the HARQ feedback time point corresponding to the UL transmission ending time point.

In the embodiment, when the preset rule is that a HARQ feedback is made only when a blind detection result is successful demodulation, each HARQ feedback time point corresponding to each UL transmission ending time point may be determined at first. For a blind detection result at any UL transmission ending time point, when the blind detection result is successful demodulation, the first information representing successful demodulation may be sent to the terminal at the HARQ feedback time point corresponding to the UL transmission ending time point. When the blind detection result is unsuccessful demodulation, HARQ feedback may be not made at the HARQ feedback time point corresponding to the UL transmission ending time point. Accordingly, a function of performing HARQ feedback only when the blind detection result is successful demodulation is realized, and on the premise of ensuring that the terminal may receive the correct HARQ information, a HARQ feedback content and a feedback frequency are reduced and the HARQ feedback efficiency is improved.

In an embodiment, based on the apparatus shown in FIGS. 14, 16 and 18, the specified position may be configured by the base station and may be in a UL grant in an RAR sent to the terminal by the base station; or the preset rule may include third information indicating the specified position, and the third information is configured to indicate a relative relationship between a HARQ feedback time point and a determined UL transmission ending time point.

Figure 20:
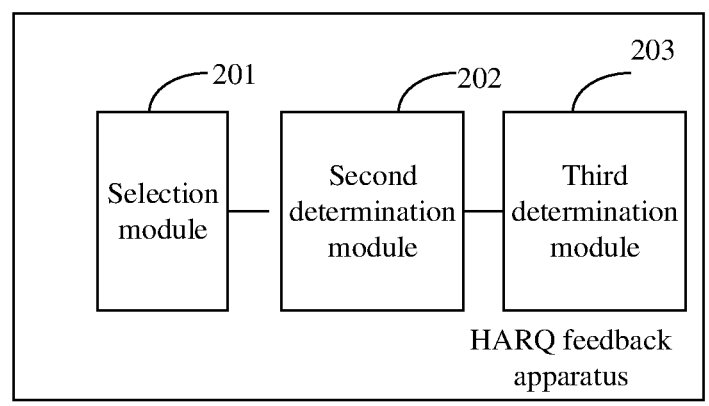
FIG. 20 is a block diagram of a HARQ feedback apparatus according to an exemplary embodiment.

FIG. 20 is a block diagram of a HARQ feedback apparatus according to an exemplary embodiment. The apparatus may be applied to a terminal. A base station may allocate multiple available scheduling resources configured to provide EDT service to the terminal, and is configured to execute the HARQ feedback method shown in FIG. 7. As shown in FIG. 20, the HARQ feedback apparatus may include: a selection module 201, configured to select an available scheduling resource from the multiple available scheduling resources and send EDT data to the base station on the selected available scheduling resource; a second determination module 202, configured to determine a HARQ feedback time point for EDT data according to a preset rule; and a third determination module 203, configured to, in response to that HARQ information sent by the base station is received at the HARQ feedback time point, determine a transmission result of the EDT data based on the HARQ information.

In the embodiment, an available scheduling resource may be selected from multiple available scheduling resources, EDT data may be sent to the base station on the selected available scheduling resource, a HARQ feedback time point for the EDT data may be determined according to a preset rule. When the HARQ information sent by the base station is received at the HARQ feedback time point, a transmission result of the EDT data may be determined based on the HARQ information. Accordingly, the HARQ feedback reliability is improved, and the EDT efficiency is also improved.

In an embodiment, based on the apparatus shown in FIG. 20, the EDT data may be UL data required to be transmitted by the terminal in a random access process and may be in a message 3 in the random access process.

Figure 21:
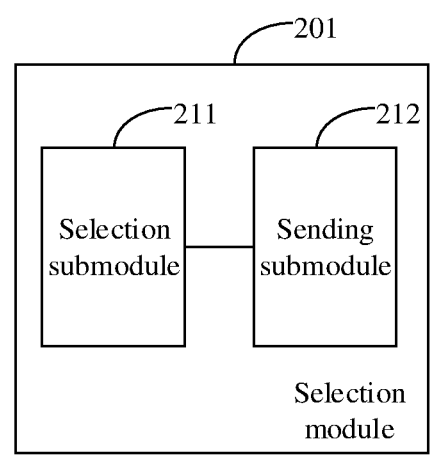
FIG. 21 is a block diagram of a HARQ feedback apparatus according to an exemplary embodiment.

In an embodiment, based on the apparatus shown in FIG. 20, the available scheduling resource may include a TBS and a UL transmission repetition count. As shown in FIG. 21, the selection module 201 may include: a selection submodule 211, configured to select the available scheduling resource from the multiple available scheduling resources based on the TBS and the UL transmission repetition count of the multiple available scheduling resources; and a sending submodule 212, configured to send the EDT data to the base station on the selected available scheduling resource.

In the embodiment, an available scheduling resource may be selected from multiple available scheduling resources based on a TBS and UL transmission repetition count in each available scheduling resource and EDT data may be sent to the base station on the selected available scheduling resource. Accordingly, the available scheduling resource may be selected accurately.

Figure 22:
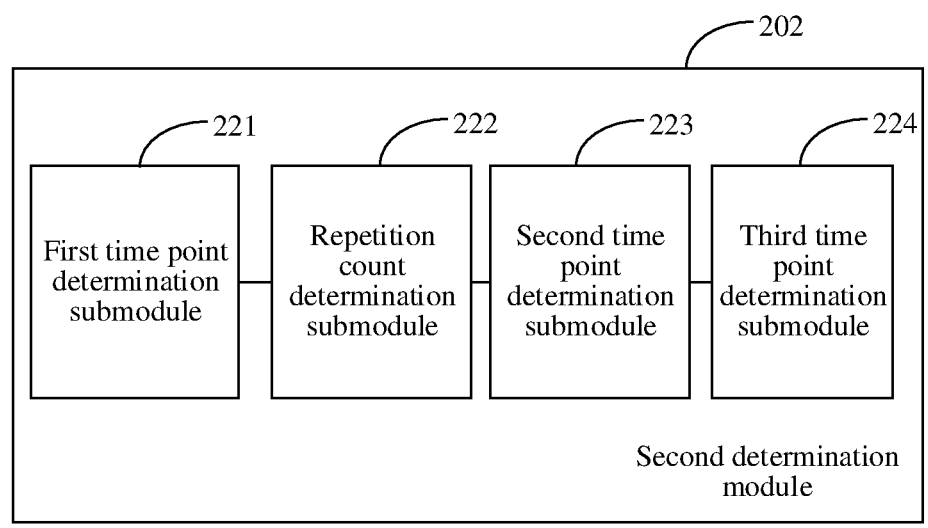
FIG. 22 is a block diagram of a HARQ feedback apparatus according to an exemplary embodiment.

In an embodiment, based on the apparatus shown in FIG. 21, the preset rule is that a HARQ feedback is made based on a maximum UL transmission repetition count. As shown in FIG. 22, the second determination module 202 may include: a first time point determination submodule 221, configured to determine each UL transmission ending time point respectively for the selected available scheduling resource based on the TBS and the UL transmission repetition count of the selected available scheduling resource; a repetition count determination submodule 222, configured to determine the maximum UL transmission repetition count according to the UL transmission repetition count in the selected available scheduling resource; a second time point determination submodule 223, configured to determine the UL transmission ending time point corresponding to the maximum UL transmission repetition count based on each UL transmission ending time point; and a third time point determination submodule 224, configured to determine the HARQ feedback time point based on the UL transmission ending time point corresponding to the maximum UL transmission repetition count, the determined HARQ feedback time point being at a specified position after the UL transmission ending time point corresponding to the maximum UL transmission repetition count.

Figure 23:
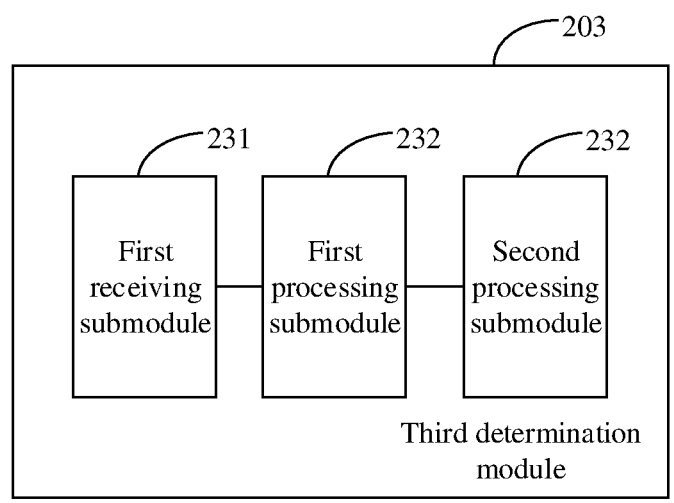
FIG. 23 is a block diagram of a HARQ feedback apparatus according to an exemplary embodiment.

In an embodiment, based on the apparatus shown in FIG. 22, as shown in FIG. 23, the third determination module 203 may include: a first receiving submodule 231, configured to receive the HARQ information from the base station at the HARQ feedback time point; a first processing submodule 232, configured to determine that the transmission result of the EDT data is successful transmission in response to that the HARQ information is the first information; and a second processing submodule 233, configured to determine that the transmission result of the EDT data is unsuccessful transmission in response to that the HARQ information is the second information.

In the embodiment, when the preset rule is that a HARQ feedback is made based on the maximum UL transmission repetition count, the maximum UL transmission repetition count may be determined based on the TBS and UL transmission repetition count in each available scheduling resource, each UL transmission ending time point may be determined respectively for each available scheduling resource, a UL transmission ending time point corresponding to the maximum UL transmission repetition count may be determined, and a HARQ feedback time point may be determined based on the UL transmission ending time point corresponding to the maximum UL transmission repetition count. The determined HARQ feedback time point may be at a specified position after the UL transmission ending time point corresponding to the maximum UL transmission repetition count. Accordingly, a function of performing HARQ feedback based on the maximum UL transmission repetition count is realized, the terminal can receive correct HARQ information, and the quality of service of HARQ feedback is also improved.

Figure 24:
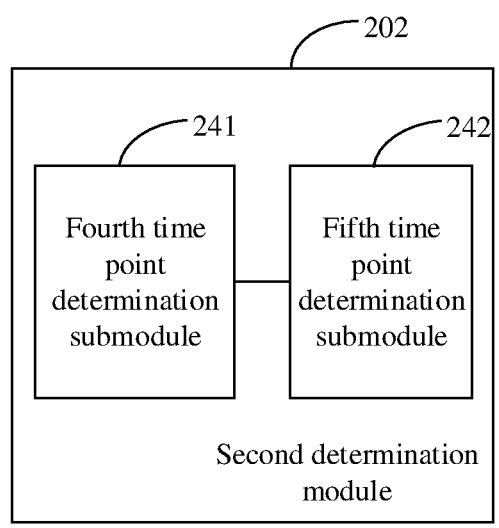
FIG. 24 is a block diagram of a HARQ feedback apparatus according to an exemplary embodiment.

In an embodiment, based on the apparatus shown in FIG. 21, the preset rule is that a HARQ feedback is made for the UL transmission ending time point respectively for each available scheduling resource. As shown in FIG. 24, the second determination module 202 may include: a fourth time point determination submodule 241, configured to determine a UL transmission ending time point corresponding to the selected available scheduling resource based on the TBS and UL transmission repetition count in the selected available scheduling resource; and a fifth time point determination submodule 242, configured to, for the UL transmission ending time point corresponding to the selected available scheduling resource, determine a HARQ feedback time point corresponding to the UL transmission ending time point, the determined HARQ feedback time point being at a specified position after the UL transmission ending time point.

Figure 25:
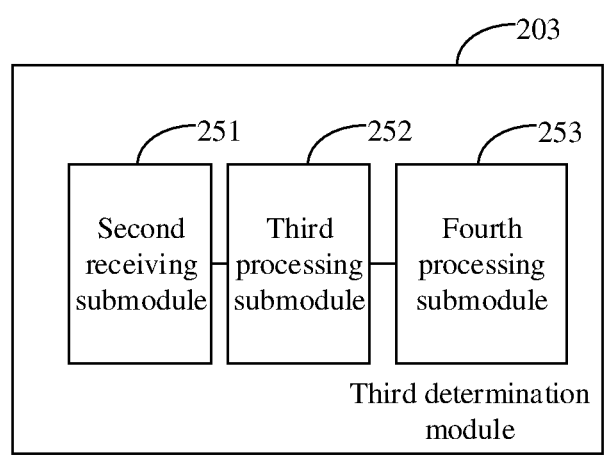
FIG. 25 is a block diagram of a HARQ feedback apparatus according to an exemplary embodiment.

In an embodiment, based on the apparatus shown in FIG. 24, the HARQ information may include first information indicating successful demodulation or second information indicating unsuccessful demodulation. As shown in FIG. 25, the third determination module 203 may include: a second receiving submodule 251, configured to receive the HARQ information from the base station at the HARQ feedback time point corresponding to the UL transmission ending time point; a third processing submodule 252, configured to, when the HARQ information is the first information, determine that the transmission result of the EDT data is successful transmission; and a fourth processing submodule 253, configured to, when the HARQ information is the second information, determine that the transmission result of the EDT data is unsuccessful transmission.

In the embodiment, when the preset rule is that a HARQ feedback is made for each UL transmission ending time point respectively for each available scheduling resource, a UL transmission ending time point corresponding to the selected available scheduling resource and a HARQ feedback time point corresponding to the UL transmission ending time point may be determined only, the HARQ information sent by the base station may be received at the HARQ feedback time point corresponding to the UL transmission ending time point. When the HARQ information is the first information indicating successful demodulation, it may be determined that the transmission result of the EDT data is successful transmission. When the HARQ information is the second information indicating unsuccessful demodulation, it may be determined that the transmission result of the EDT data is unsuccessful transmission. Accordingly, the accuracy of the transmission result is improved.

Figure 26:
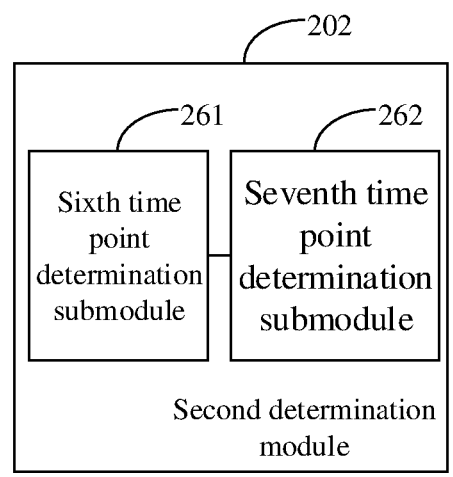
FIG. 26 is a block diagram of a HARQ feedback apparatus according to an exemplary embodiment.

In an embodiment, based on the apparatus shown in FIG. 21, the preset rule is that a HARQ feedback is made only when a blind detection result is successful demodulation. As shown in FIG. 26, the second determination module 202 may include: a sixth time point determination submodule 261, configured to determine a UL transmission ending time point corresponding to the selected available scheduling resource based on the TBS and UL transmission repetition count in the selected available scheduling resource; and a seventh time point determination submodule 262, configured to, for the UL transmission ending time point corresponding to the selected available scheduling resource, determine the HARQ feedback time point corresponding to the UL transmission ending time point, the determined HARQ feedback time point being at a specified position after the UL transmission ending time point.

Figure 27:
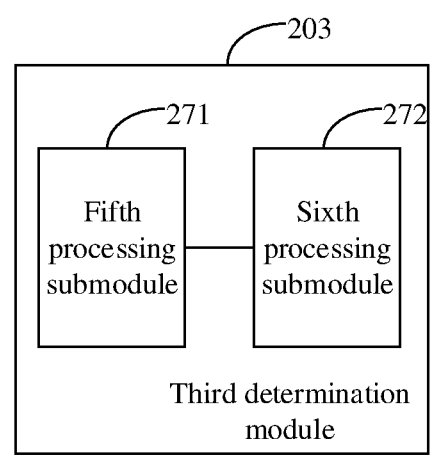
FIG. 27 is a block diagram of a HARQ feedback apparatus according to an exemplary embodiment.

In an embodiment, based on the apparatus shown in FIG. 26, as shown in FIG. 27, the third determination module 203 may include: a fifth processing submodule 271, configured to, in response to receiving the HARQ information from the base station at the HARQ feedback time point corresponding to the UL transmission ending time point and the HARQ information being the first information, determine that the transmission result of the EDT data is successful transmission; and a sixth processing submodule 272, configured to, in response to not receiving the HARQ information from the base station at the HARQ feedback time point corresponding to the UL transmission ending time point, determine that the transmission result of the EDT data is unsuccessful transmission.

In the embodiment, when the preset rule is that a HARQ feedback is made only when a blind detection result is successful demodulation, a UL transmission ending time point corresponding to the selected available scheduling resource and a HARQ feedback time point corresponding to the UL transmission ending time point may be determined only. In response to receiving the HARQ information from the base station at the HARQ feedback time point corresponding to the UL transmission ending time point and the HARQ information being the first information indicating successful demodulation, it may be determined that the transmission result of the EDT data is successful transmission. In response to not receiving the HARQ information at the HARQ feedback time point corresponding to the UL transmission ending time point, it may be determined that the transmission result of the EDT data is unsuccessful transmission. Accordingly, the accuracy of the transmission result is ensured, in addition, a HARQ feedback content and a feedback frequency are also reduced, and the HARQ feedback efficiency is improved.

In an embodiment, based on the apparatus shown in FIG. 22, or FIG. 24 or FIG. 26, the specified position may be configured by the base station and may be in a UL grant in an RAR sent to the terminal by the base station; or the preset rule may include third information indicating the specified position, and the third information is configured to indicate a relative relationship between a HARQ feedback time point and a determined UL transmission ending time point.

The apparatus embodiments substantially correspond to the method embodiments. For details of operations performed by individual modules, reference may be made to the method embodiments. The apparatus embodiments described above are only exemplary, modules described as separate parts therein may or may not be physically separated, and parts displayed as modules may be located in the same place or may also be distributed to multiple networks. Part or all of the modules may be selected according to an actual requirement. Each of the above described modules or submodules may be implemented by software, or hardware, or a combination of software and hardware.

The present disclosure also provides a non-transitory computer-readable storage medium having stored thereon instructions that, when executed by a processor of a base station, cause the base station to perform the HARQ feedback methods in FIG. 1 to FIG. 6C.

The present disclosure also provides a non-transitory computer-readable storage medium having stored thereon instructions that, when executed by a processor of a terminal, cause the terminal to perform the HARQ feedback methods in FIG. 7 to FIG. 11.

The present disclosure also provides a HARQ feedback apparatus, which is applicable to a base station that allocates multiple available scheduling resources configured to provide EDT service to a terminal. The apparatus may include: a processor; and a memory configured to store instructions executable by the processor, wherein the processor is configured to: perform blind detection on EDT data transmitted by the terminal on respective available scheduling resources; determine a HARQ feedback time point for the blind detection according to a preset rule; and send HARQ information about the blind detection to the terminal at the HARQ feedback time point.

Figure 28:
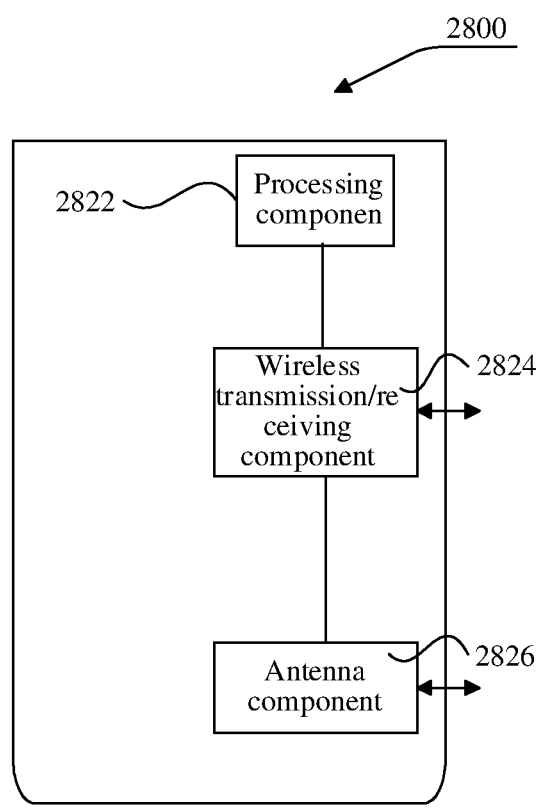
FIG. 28 is a structure diagram of a HARQ feedback apparatus according to an exemplary embodiment.

FIG. 28 is a schematic diagram of a HARQ feedback apparatus 2800 according to an exemplary embodiment. The apparatus 2800 may be provided as a base station. Referring to FIG. 28, the apparatus 2800 includes a processing component 2822, a wireless transmission/receiving component 2824, an antenna component 2826 and a wireless interface-specific signal processing part. The processing component 2822 may further include one or more processors. One processor in the processing component 2822 may be configured to perform the above described HARQ feedback methods.

The present disclosure also provides a HARQ feedback apparatus, which is applicable to a terminal, a base station allocating multiple available scheduling resources configured to provide EDT service to a terminal. The apparatus may include: a processor; and a memory configured to store instructions executable by the processor, wherein the processor is configured to: select an available scheduling resource from the multiple available scheduling resources and send EDT data to the base station on the selected available scheduling resource; determine a HARQ feedback time point for the EDT data according to a preset rule; and when HARQ information sent by the base station is received at the HARQ feedback time point, determine a transmission result of the EDT data based on the HARQ information.

Figure 29:
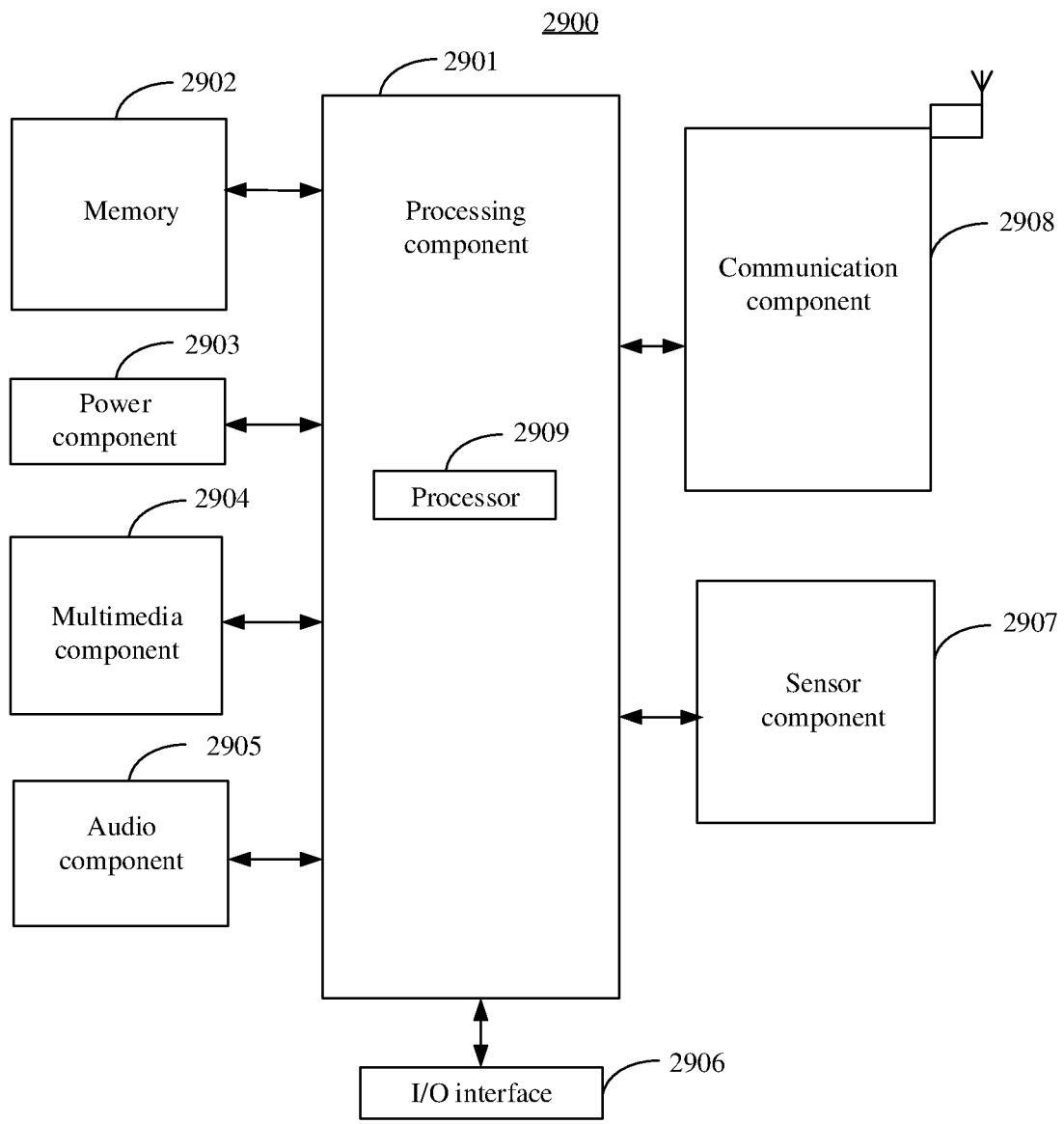
FIG. 29 is a structure diagram of a HARQ feedback apparatus according to an exemplary embodiment.

FIG. 29 is a schematic diagram of a HARQ feedback apparatus 2900 according to an exemplary embodiment. The HARQ feedback apparatus 2900 may be a terminal such as a computer, a mobile phone, a digital broadcast terminal, a messaging device, a gaming console, a tablet, a medical device, exercise equipment and a personal digital assistant.

Referring to FIG. 29, the HARQ feedback apparatus 2900 may include one or more of the following components: a processing component 2901, a memory 2902, a power component 2903, a multimedia component 2904, an audio component 2905, an Input/Output (I/O) interface 2906, a sensor component 2907, and a communication component 2908.

The processing component 2901 typically controls overall operations of the HARQ feedback apparatus 2900, such as the operations associated with display, telephone calls, data communications, camera operations, and recording operations. The processing component 2901 may include one or more processors 2909 to execute instructions to perform all or part of the operations in the abovementioned method. Moreover, the processing component 2901 may include one or more modules which facilitate interaction between the processing component 2901 and the other components. For instance, the processing component 2901 may include a multimedia module to facilitate interaction between the multimedia component 2904 and the processing component 2901.

The memory 2902 is configured to store various types of data to support the operation of the HARQ feedback apparatus 2900. Examples of such data include instructions for any applications or methods operated on the HARQ feedback apparatus 2900, contact data, phonebook data, messages, pictures, video, etc. The memory 2902 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 2903 may provide power for various components of the HARQ feedback apparatus 2900. The power component 2903 may include a power management system, one or more power supplies, and other components associated with generation, management and distribution of power for the HARQ feedback apparatus 2900.

The multimedia component 2904 may include a screen providing an output interface between the HARQ feedback apparatus 2900 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 2904 includes a front camera and/or a rear camera. The front camera and/or the rear camera may receive external multimedia data when the HARQ feedback apparatus 2900 is in an operation mode, such as a photographing mode or a video mode. Each of the front camera and the rear camera may be a fixed optical lens system or have focusing and optical zooming capabilities.

The audio component 2905 is configured to output and/or input an audio signal. For example, the audio component 2905 includes a Microphone (MIC), and the MIC is configured to receive an external audio signal when the HARQ feedback apparatus 2900 is in the operation mode, such as a call mode, a recording mode and a voice recognition mode. The received audio signal may further be stored in the memory 2902 or sent through the communication component 2908. In some embodiments, the audio component 2905 further includes a speaker configured to output the audio signal.

The I/O interface 2906 may provide an interface between the processing component 2901 and a peripheral interface module, and the peripheral interface module may be a keyboard, a click wheel, a button and the like. The button may include, but not limited to: a home button, a volume button, a starting button and a locking button.

The sensor component 2907 includes one or more sensors configured to provide status assessment in various aspects for the HARQ feedback apparatus 2900. For instance, the sensor component 2907 may detect an on/off status of the HARQ feedback apparatus 2900 and relative positioning of components, such as a display and small keyboard of the HARQ feedback apparatus 2900, and the sensor component 2907 may further detect a change in a position of the HARQ feedback apparatus 2900 or a component of the HARQ feedback apparatus 2900, presence or absence of contact between the user and the HARQ feedback apparatus 2900, orientation or acceleration/deceleration of the HARQ feedback apparatus 2900 and a change in temperature of the HARQ feedback apparatus 2900. The sensor component 2907 may include a proximity sensor configured to detect presence of an object nearby without any physical contact. The sensor component 2907 may also include a light sensor, such as a Complementary Metal Oxide Semiconductor (CMOS) or Charge Coupled Device (CCD) image sensor, configured for use in an imaging application. In some embodiments, the sensor component 2907 may also include an acceleration sensor, a gyroscope sensor, a magnet sensor, a pressure sensor or a temperature sensor.

The communication component 2908 is configured to facilitate wired or wireless communication between the HARQ feedback apparatus 2900 and another apparatus. The HARQ feedback apparatus 2900 may access a communication-standard-based wireless network, such as a Wireless Fidelity (WiFi) network, a 4th-Generation (4G) or 5th-Generation (5G) network or a combination thereof. In an exemplary embodiment, the communication component 2908 receives a broadcast signal or broadcast associated information from an external broadcast management system through a broadcast channel. In an exemplary embodiment, the communication component 2908 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the HARQ feedback apparatus 2900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the above described methods.

In an exemplary embodiment, there is also provided a non-transitory computer-readable storage medium including an instruction, such as the memory 2902 including an instruction, and the instruction may be executed by the processor 2909 of the HARQ feedback apparatus 2900 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like. The instruction in the storage medium is executed by the processor to cause the HARQ feedback apparatus 2900 to perform the above described HARQ feedback methods.

The technical solutions provided in the embodiments of the present disclosure may have the following beneficial effects.

In the present disclosure, a base station may perform blind detection on EDT data transmitted to the base station by a terminal on each available scheduling resource, determine a HARQ feedback time point for the blind detection according to a preset rule and send HARQ information about the blind detection to the terminal at the HARQ feedback time point. Then, the terminal may receive the HARQ information from the base station at the HARQ feedback time point determined according to the preset rule and determine a correct transmission result of the EDT data based on the HARQ information. Accordingly, the HARQ feedback reliability is improved, and the EDT efficiency is also improved.

In the present disclosure, the terminal may select an available scheduling resource from multiple available scheduling resources, send the EDT data to the base station on the selected available scheduling resource, determine the HARQ feedback time point for the EDT data according to the preset rule and, when receiving the HARQ information from the base station at the HARQ feedback time point, determine the transmission result of the EDT data based on the HARQ information. Accordingly, the HARQ feedback reliability is improved, and the EDT efficiency is also improved.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A hybrid automatic repeat request (HARQ) feedback method, applicable to a base station that allocates, to a terminal, multiple available scheduling resources configured to provide Early Data Transmission (EDT) service, the method comprising:
   performing blind detection on EDT data transmitted to the base station by the terminal on the multiple available scheduling resources;
   determining a HARQ feedback time point for the blind detection according to a preset rule that a HARQ feedback is made for a plurality of uplink (UL) transmission ending time points respectively for the multiple available scheduling resources, comprising:
      for each available scheduling resource, determining a respective UL transmission ending time point based on a Transmission Block Size (TBS) and a UL transmission repetition count in the available scheduling resource; and
      for each UL transmission ending time point, determining a respective HARQ feedback time point, wherein the determined HARQ feedback time point is at a specified position after the UL transmission ending time point; and
   sending HARQ information about the blind detection to the terminal at the HARQ feedback time point.

2. The HARQ feedback method of claim 1, wherein the EDT data is uplink (UL) data transmitted by the terminal in a random access process and is in a message 3 in the random access process.

3. The HARQ feedback method of claim 1, wherein the HARQ information about the blind detection comprises first information indicating successful demodulation or second information indicating unsuccessful demodulation; and
   sending the HARQ information about the blind detection to the terminal at the HARQ feedback time point comprises:
      in response to determining that a blind detection result at any UL transmission ending time point is successful demodulation, sending the first information to the terminal at the HARQ feedback time point corresponding to the UL transmission ending time point; and
      in response to determining that the blind detection result is unsuccessful demodulation, sending the second information to the terminal at the HARQ feedback time point corresponding to the UL transmission ending time point.

4. The HARQ feedback method of claim 1, wherein the specified position is configured by the base station and is in a UL grant in a Random Access Response (RAR) sent to the terminal by the base station; or
   the preset rule comprises third information indicating the specified position, and the third information indicates a relative relationship between a HARQ feedback time point and a determined UL transmission ending time point.

5. A hybrid automatic repeat request (HARQ) feedback method, applicable to a base station that allocates, to a terminal, multiple available scheduling resources configured to provide Early Data Transmission (EDT) service, the method comprising:
 performing blind detection on EDT data transmitted to the base station by the terminal on the multiple available scheduling resources;
 determining a HARQ feedback time point for the blind detection according to a preset rule that a HARQ feedback is made only when a blind detection result is successful demodulation, comprising:
  for each available scheduling resource, determining a respective uplink (UL) transmission ending time point based on a Transmission Block Size (TBS) and a UL transmission repetition count in the available scheduling resource; and
  for each UL transmission ending time point, determining a respective HARQ feedback time point, wherein the determined HARQ feedback time point is at a specified position after the UL transmission ending time point; and
 sending HARQ information about the blind detection to the terminal at the HARQ feedback time point.

6. The HARQ feedback method of claim 5, wherein the HARQ information about the blind detection comprises first information indicating successful demodulation; and
 sending the HARQ information about the blind detection to the terminal at the HARQ feedback time point comprises:
  in response to determining that a blind detection result at any UL transmission ending time point is successful demodulation, sending the first information to the terminal at the HARQ feedback time point corresponding to the UL transmission ending time point; and
  in response to determining that the blind detection result is unsuccessful demodulation, not performing HARQ feedback at the HARQ feedback time point corresponding to the UL transmission ending time point.

7. The HARQ feedback method of claim 5, wherein the specified position is configured by the base station and is in a UL grant in a Random Access Response (RAR) sent to the terminal by the base station; or
 the preset rule comprises third information indicating the specified position, and the third information indicates a relative relationship between a HARQ feedback time point and a determined UL transmission ending time point.

8. The HARQ feedback method of claim 5, wherein the EDT data is uplink (UL) data transmitted by the terminal in a random access process and is in a message 3 in the random access process.

9. A base station that allocates to, a terminal, multiple available scheduling resources configured to provide Early Data Transmission (EDT) service, the base station comprising:
 a processor; and
 memory configured to store instructions executable by a processor,
 wherein the processor is configured to:
  perform blind detection on EDT data transmitted to the base station by the terminal on the multiple available scheduling resources;
  determine a hybrid automatic repeat request (HARQ) feedback time point for the blind detection according to a preset rule that a HARQ feedback is made based on a maximum uplink transmission repetition count, comprising:
   for each available scheduling resource, determining a respective uplink (UL) transmission ending time point based on a Transmission Block Size (TBS) and a UL transmission repetition count in the available scheduling resource;
   determining the maximum UL transmission repetition count according to UL transmission repetition counts in the multiple available scheduling resources;
   determining an UL transmission ending time point corresponding to the maximum UL transmission repetition count according to UL transmission ending time points corresponding to the multiple available scheduling resources; and
   determining the HARQ feedback time point based on the UL transmission ending time point corresponding to the maximum UL transmission repetition count, wherein the determined HARQ feedback time point is at a specified position after the UL transmission ending time point corresponding to the maximum UL transmission repetition count; and
  send HARQ information about the blind detection to the terminal at the HARQ feedback time point.

10. The base station of claim 9, wherein the EDT data is uplink (UL) data transmitted by the terminal in a random access process and is in a message 3 in the random access process.

11. The base station of claim 9, wherein the HARQ information about the blind detection comprises first information indicating successful demodulation or second information indicating unsuccessful demodulation; and in sending the HARQ information about the blind detection to the terminal at the HARQ feedback time point, the processor is further configured to:
 send the first information to the terminal at the HARQ feedback time point in response to determining that each blind detection result at each UL transmission ending time point comprises successful demodulation; and
 send the second information to the terminal at the HARQ feedback time point in response to determining that each blind detection result does not comprise successful demodulation.

12. The base station of claim 9, wherein the specified position is configured by the base station and is in a UL grant in a Random Access Response (RAR) sent to the terminal by the base station; or
 the preset rule comprises third information indicating the specified position, and the third information indicates a relative relationship between a HARQ feedback time point and a determined UL transmission ending time point.

* * * * *